(12) United States Patent
Pierini et al.

(10) Patent No.: US 7,671,873 B1
(45) Date of Patent: Mar. 2, 2010

(54) SYSTEMS FOR AND METHODS OF PROCESSING SIGNALS IN A GRAPHICS FORMAT

(75) Inventors: Danny Pierini, Montreal (CA); Francois Germain, Lorraine (CA); Jean Lapierre, Pierrefonds (CA)

(73) Assignee: Matrox Electronics Systems, Ltd., Dorval, Quebec (CA)

( * ) Notice: Subject to any disclaimer, the term of this patent is extended or adjusted under 35 U.S.C. 154(b) by 682 days.

(21) Appl. No.: 11/408,813

(22) Filed: Apr. 21, 2006

Related U.S. Application Data

(60) Provisional application No. 60/707,604, filed on Aug. 11, 2005.

(51) Int. Cl.
G09G 5/02 (2006.01)
(52) U.S. Cl. .............. 345/603; 348/389.1; 348/432.1; 348/443; 386/5; 386/12; 386/35
(58) Field of Classification Search .............. 348/389.1, 348/432.1; 386/5, 35
See application file for complete search history.

(56) References Cited

U.S. PATENT DOCUMENTS

| 5,995,080 A * | 11/1999 | Biro et al. .................... 345/603 |
| 2002/0097322 A1 * | 7/2002 | Monroe et al. .............. 348/159 |

OTHER PUBLICATIONS

"SAA7110; SAA7110A—One Chip Front-end 1 (OCF1) from NXP Semiconductors." NPX Semiconductors. Product specification dated: Oct. 18, 1995. Accessed via http://www.nxp.com/pip/SAA7110_A_1. Accessed Jul. 30, 2009.*

Apple DVI to Video Adapter. Datasheet [online]. The Apple Store, 2006 [retrieved on May 10, 2006]. Retrieved from the Internet: <URL: www.store.apple.com/1-800-MY-APPLE/WebObjects/AppleStore?productLearnMore=M9267G.>.

VGA to Component Video. Datasheet [online]. S-Video, 1994-2006 [retrieved on May 10, 2006]. Retrieved from the Internet. <URL:www.svideo.com/pctocomponent.html>.

PC to TV Converter. Datasheet [online]. S-Video [retrieved on May 10, 2006]. Retrieved from the Internet. <URL:www.svideo.com/vga2video2.html>.

(Continued)

*Primary Examiner*—Antonio A Caschera
(74) *Attorney, Agent, or Firm*—Lando & Anastasi, LLP

(57) ABSTRACT

According to one aspect, the invention provides an apparatus for converting data encoded in a graphics signal to at least one output signal. The apparatus includes an input, a plurality of outputs, signal processing circuitry and a controller. The input is adapted to receive the graphics signal where the graphics signal includes a plurality of frames generated at least in part from original data. The signal processing circuitry is adapted to locate, in the graphics signal, data corresponding to the original data, convert the data corresponding to the original data to output data and communicate the output data to the plurality of outputs. The controller is adapted to monitor a capacity of the signal processing circuitry and generate a signal that results in at least one disposable frame being added to the plurality of frames. The signal processing circuitry is adapted to discard the at least one disposable frame.

27 Claims, 13 Drawing Sheets

OTHER PUBLICATIONS

VGA to Video. Datasheet [online]. S-Video [retrieved on May 10, 2006]. Retrieved from the Internet. <URL:www.svideo.com/vgatotv.html>.

Blackmagic Design: Multibridge. Datasheet [online]. Blackmagic-Design, 2006 [retrieved on May 10, 2006]. Retrieved from the Internet. <URL:www.blackmagic-design.com/products/multibridge/>.

AJA Video-Serial Digital Video Interface and Conversion. Datasheet [online]. AJA Video Systems, 2006 [retrieved on May 10, 2006]. Retrieved from the Internet. <URL:www.aja.com/html/products_Io.html>.

Canada Video Capture, Video Capture Cards, Video Capture Software at TigerDirect.ca. Datasheet [online]. TigerDirect.ca, 2006 [retrieved on May 10, 2006]. Retrieved from the Internet. <URL:www.tigerdirect.ca/applications/category/category_tlc.asp?CatID=1423>.

Dazzle*. Datasheet [online]. Pinnacle Systems, Inc., 2006 [retrieved on May 10, 2006]. Retrieved from the Internet. <URL:www.pinnaclesys.com/PublicSite/us/Products/Consumer+Products/Home+Video/Dazzle/?d . . . >.

Pinnacle Systems-Product Summary-ShowCenter 200. Datasheet [online]. Pinnacle Systems, Inc., 2006 [retrieved May 10, 2006]. Retrieved from the Internet. <URL:www.pinnaclesys.com/PublicSite/us/Products/Consumer+Products/Digital+Media+Adapter . . . >.

* cited by examiner

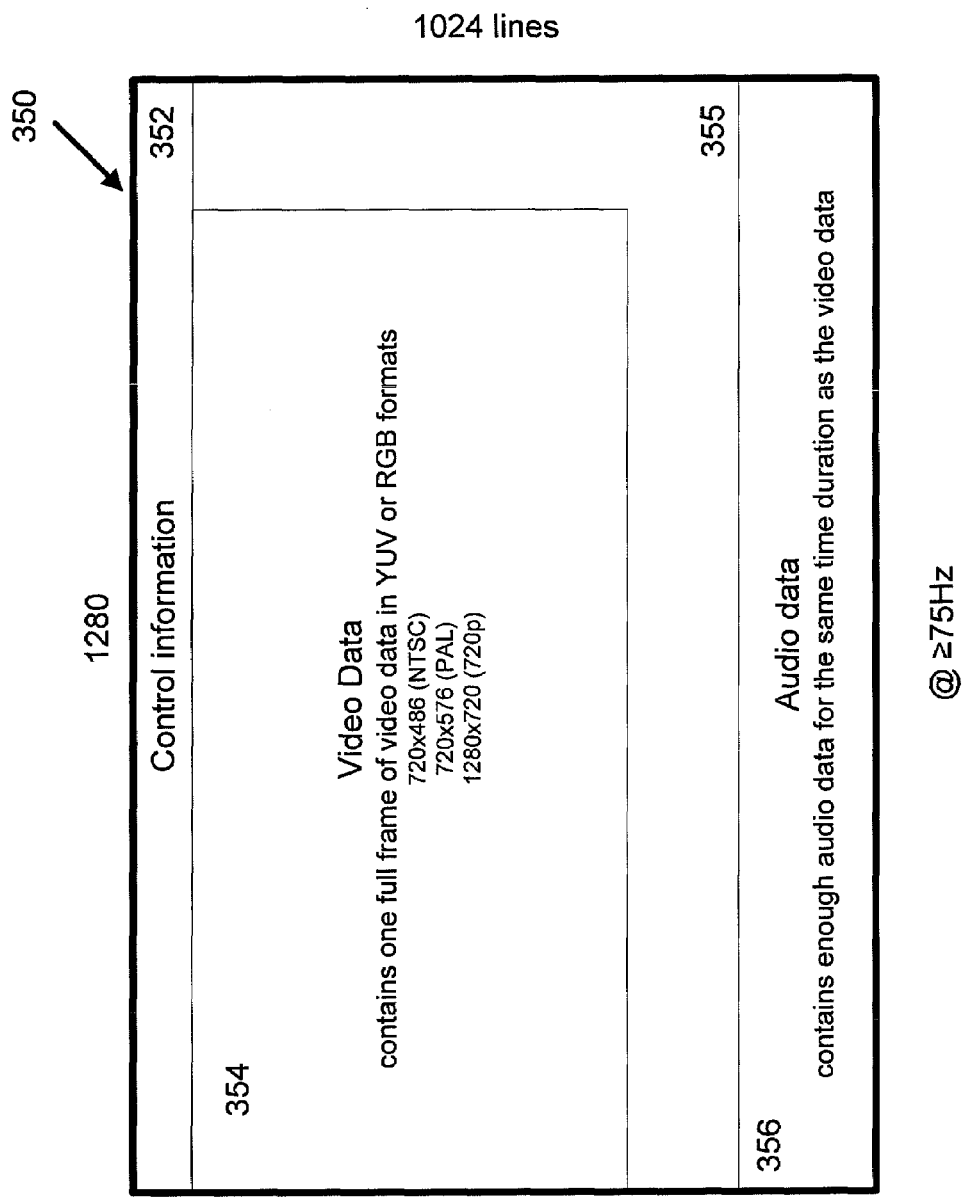

SYSTEMS FOR AND METHODS OF PROCESSING SIGNALS IN A GRAPHICS FORMAT

RELATED APPLICATIONS

This application claims priority under 35 U.S.C. § 119(e) to co-pending U.S. Provisional Application Ser. No. 60/707,604, entitled "METHOD AND APPARATUS TO FRAME ACCURATE VIDEO, AUDIO AND GRAPHICS OUTPUT USING A STANDARD DISPLAY ADAPTER," filed on Aug. 11, 2005, which is herein incorporated by reference in its entirety.

BACKGROUND OF INVENTION

1. Field of Invention

Embodiments of the invention generally relate to systems for and methods of signal processing, and in particular, to processing a signal which includes data originating in any one of a plurality of formats which is encoded in an image.

2. Discussion of Related Art

Today, there exist many applications where media includes a plurality of signal types such as audio signals that drive sound equipment, video signals that drive video displays and graphics signals that drive graphic displays. Generally, it is desirable to synchronize each of the audio, video and graphics signals with one another to provide an integrated media display or plurality of integrated displays. The synchronization of an audio output with a video output to insure a match between a movement of the lips of a speaker in the video image and the spoken word that is being provided by the audio output at the same moment provides one example.

The availability of increasingly advanced video editing and animation systems for desktop and laptop computers provide current examples where synchronized outputs in a variety of output formats may be desired. For example, a video editing system (e.g., Adobe Premiere, Apple Final Cut Pro) may result in a composition that includes an audio signal and a video signal that should be synchronized to a common time base. Similar systems may be employed in professional studio production facilities where a studio genlock signal is available.

Software that allows users to convert presentations to video provides another example in which signals in a plurality of formats may be combined in a composition. In one specific example, a power point presentation (i.e., a graphics file) is converted to standard video format where the composition includes the video and an audio signal that is generated by a different application.

A variety of approaches have been attempted to synchronize a plurality of signals in different formats with one another. In one approach, a timing reference, for example, a genlock signal is used to synchronize a graphics frame buffer. This approach, however, requires a specialized graphics controller where a pixel clock and a synch generator of the graphics controller are each synchronized to the reference signal to provide synchronized outputs. As a result, the approach requires expensive dedicated hardware.

Other current approaches provide a synchronized output by employing an approach that is sometimes referred to as time-based correction. This approach does not necessarily require the specialized hardware described above, however, time-based correction generally results in the loss of a frame-accurate playback of the signals because synchronization is achieved by adding repeat frames to an output signal that would otherwise advance out-of-sync and dropping other frames of the original data from the signal when the output has dropped behind the frame required for synchronization.

As used herein, a frame-accurate output refers to an output that, for a signal of original data that includes a plurality of frames, the output includes each of the frames in the same uninterrupted sequence as the frames appeared in the original data (e.g., the output does not include repeated frames, added frames, frame-deletions, and/or changes in the sequence of frames relative to the original data).

As one example of frame accuracy, the NTSC DVD format that is commonly used in the U.S. and Canada delivers 29.97 frames per second. Thus, a frame-accurate output corresponding to a NTSC formatted input includes each of the 29.97 frames in sequence that are provided in one second by the input without addition or deletion. Frame-accuracy does not require that the rate at which the original data is presented exactly match the rate of the input signal. In addition, frame-accuracy may apply to an output that corresponds to an input having any frame rate and in any format where the output may be in the same format or a different format than the original data.

Other approaches require that specialized hardware be installed with the computer to provide a frame accurate output in a plurality of output formats. That is, a commonly-available output for a PC cannot be used to supply a signal that integrates audio, video and graphics. In addition, currently available hardware is not hot-swappable, that is, the hardware cannot be connected to a computer when the computer is operational. Further, such specialized hardware generally lacks portability and is not platform compatible with a wide variety of commonly available platforms.

SUMMARY OF INVENTION

In various embodiments, the invention allows an output of a standard graphics display controller to simultaneously output data corresponding to any of audio data, video data and graphics data in the graphics signal and provide signal processing of the graphics output of the display controller to generate each of an audio output, a video output and a graphics output where the outputs are frame accurate and synchronized to a reference signal.

According to one aspect, the invention provides an apparatus for converting data encoded in a graphics signal to at least one output signal. The apparatus includes input adapted to receive the graphics signal where the graphics signal includes a plurality of frames generated at least in part from original data. The original data includes data in at least one of a plurality of original formats. The apparatus also includes a plurality of outputs including at least one output corresponding to each of a plurality of output formats. The apparatus further includes signal processing circuitry and a controller. The signal processing circuitry is in communication with the input and the plurality of outputs and is adapted to locate, in the graphics signal, data corresponding to the original data, convert the data corresponding to the original data to output data and communicate the output data to the plurality of outputs. The controller is in communication with the signal processing circuitry and is adapted to monitor a capacity of the signal processing circuitry and generate a signal that results in at least one disposable frame being added to the plurality of frames. In addition, the signal processing circuitry is adapted to discard the at least one disposable frame.

In a further aspect, the invention provides a system for encoding data in an image. The system comprises a formatting module and a frame control module. The formatting module is adapted to receive data in at least one of a plurality of original data formats from at least one software application, to generate modified data that includes the original data formatted for processing by a graphics controller, and to communicate the modified data to the graphics controller as a plurality of frames of graphics data. The frame control module is adapted to receive information concerning a capacity of signal processing circuitry and to generate an output to control an addition of at least one disposable frame that may be added to the plurality of frames by the formatting module. The formatting module is adapted to add the at least one disposable frame as necessary to control a rate at which the original data is processed by the signal processing circuitry. In addition, the signal processing circuitry is adapted to receive an output that includes the plurality of frames from the graphics controller and to generate an output signal from the plurality of frames by discarding at least one of the at least one disposable frame that may be added by the formatting module.

In yet another aspect of the invention, a method is provided for converting, with signal processing circuitry, data originated from at least one of a plurality of data formats to an output signal. The method comprises the acts of receiving the data encoded in a plurality of frames in a graphics signal wherein the plurality of frames may include at least one disposable frame, controlling a rate at which the data is converted, at least in part, by monitoring a capacity of a signal processing circuitry to determine whether the plurality of frames should include the at least one disposable frame and determining whether the plurality of frames includes the at least one disposable frame. When the plurality of frames includes the at least one disposable frame, the at least one disposable frame is discarded and the output signal is generated by converting the data encoded in a plurality of frames that remain after the act of discarding. When the plurality of frames does not include the at least one disposable frame, the output signal is generated by converting the data encoded in the plurality of frames in the graphics signal.

In a further aspect, the invention provides a computer-readable medium encoded with a program for execution on a processor, the program, when executed on the processor performing a method of encoding original data in a graphics signal. The method includes the acts of receiving the original data in at least one of a plurality of original formats and receiving a signal indicative of a capacity of signal processing circuitry adapted to process the graphics signal by discarding at least one disposable frame that may be included in the graphics signal. When the signal indicates that the signal processing circuitry has sufficient capacity to process new data, the original data is converted to a first plurality of frames of graphics data and the first plurality of frames are communicated to a graphics controller. When the signal indicates that the signal processing circuitry has insufficient capacity to process new data the original data is converted to a second plurality of frames of graphics data, where the second plurality of frames includes at least one disposable frame, and the second plurality of frames is communicated to the graphics controller.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 3A illustrates a frame of graphics data including encoded audio and video data in accordance with an embodiment of the invention;

DETAILED DESCRIPTION

Figure 1:
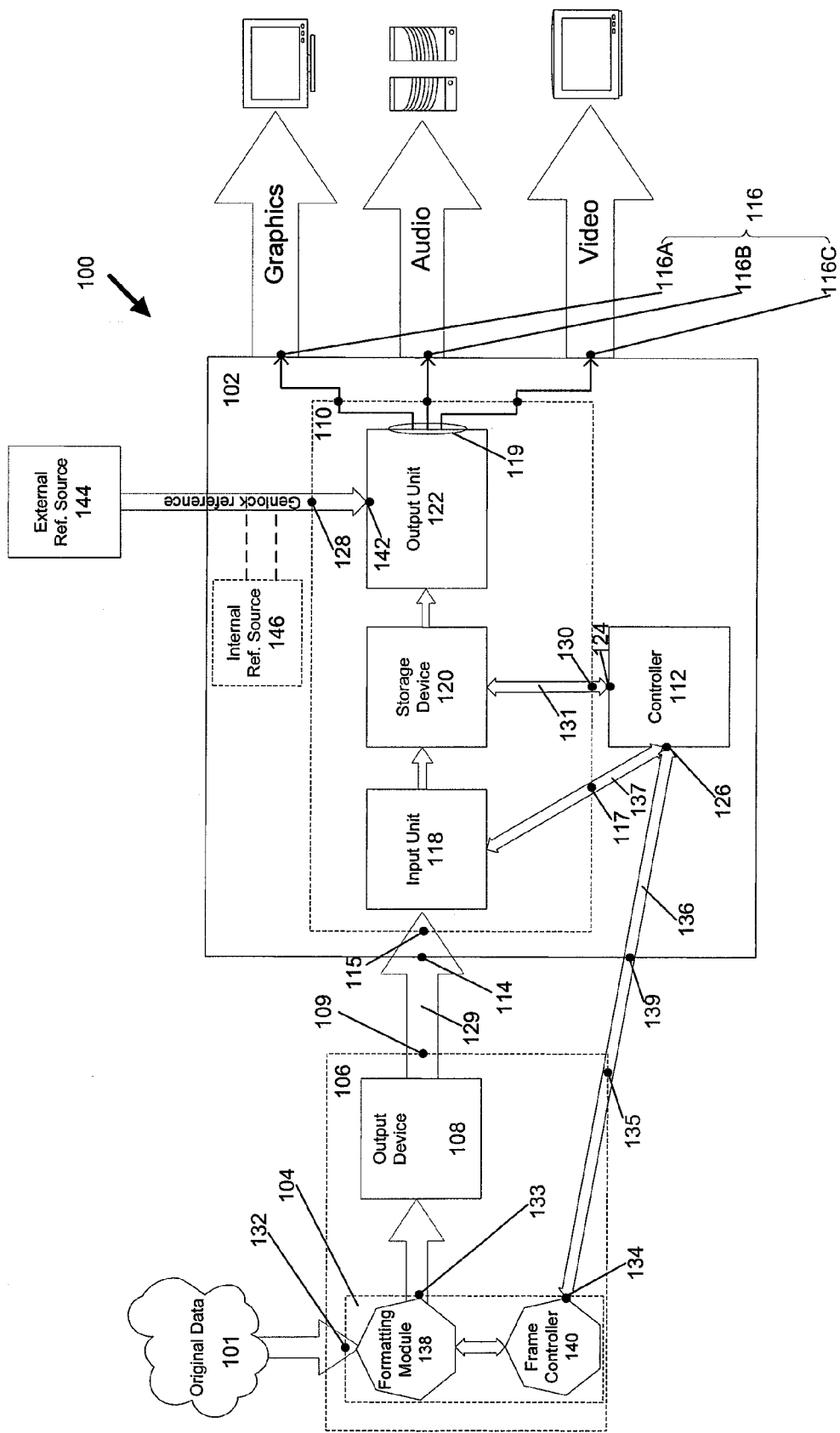
FIG. 1 is a block diagram of a system in accordance with one embodiment of the invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Referring now to FIG. 1, a system 100 is illustrated for converting original data 101 from one or a plurality of original formats to an encoded output and converting the encoded output to the original data 101 in one or more output formats. In one embodiment, the one or more output formats may be one or more formats that are the same as or different than the original format or formats. For example, the output format or formats may include at least one of the original formats. As used herein, the phrase "original data" is used to describe the data that is received by the system 100.

In one embodiment, the system includes a processing device 102 and a control module 104. The control module 104 may be included in a computer 106 that also includes an output device 108 and an output 109. The control module 104 may include an input 132 to receive the original data 101, and an output 133 to communicate data (including reformatted data) corresponding to the original data to the output device 108.

In one embodiment, the output device 108 is a graphics controller, that generates a digital output signal. According to one embodiment, the digital output signal is provided at a digital video interface port ("DVI"), for example, a DVI-I port. In another embodiment, the output device 108 is a graphics controller that generates an analog output signal provided at a video graphics adapter ("VGA") port. In general, the system 100 may employ any graphics interface (i.e., graphics controller) including a standard graphics display controller. That is, the processing device 102 may be adapted to connect to and process DVI and VGA outputs. In a version of this embodiment, the output device 108 is a standard graphics display controller provided on a graphics card, for example, one of a NVIDIA GeForce 6600 256 MB SDRAM, a NVIDIA GeForce 7800 GT 256 MB SDRAM, and a QUADRO FX4500 512 MB SDRAM. According to another embodiment, the output device 108 is integrated into a chipset. The output device 108, however, need not be a graphics display controller and may instead be any relatively high bandwidth output with the capability of generating an output signal from data that includes the original data 101 (possibly originating in a plurality of formats) reformatted into a single format. In one embodiment, the output device 108 is selected for operation at a bandwidth that is equal to or greater than the sum of a bandwidth of the original data 101.

According to one embodiment, the processing device 102 includes signal processing circuitry 110, a controller 112, an input 114 and a plurality of outputs 116, for example, the processing device 102 may include each of the preceding elements in a housing. The signal processing circuitry 110 can include an input unit 118, a storage device 120 and an output unit 122. In one embodiment, the controller 112 includes a first I/O 124 and a second I/O 126. In a further embodiment, the signal processing circuitry 110 includes a timing input 128 for receiving a reference signal that is used to synchronize the plurality of outputs 116, an input 115 in communication with the input 114 of the processing device 102, an I/O 117 in communication with the controller 112, an I/O 130 in communication with the I/O 124 of the controller 112, and an output 119 in communication with the output 116.

In some embodiments, one or more of the inputs and outputs are integrated into the elements of the signal processing circuitry 110. For example, the inputs 114 and 115, and the I/O 117 may be included in the input unit 118, the timing input 128 and the outputs 119 and 116 may be included in the output unit 122, and the I/O 130 may be included in the storage device 120.

The plurality of outputs 116 may include outputs that may each provide an output in a different format. For example, the illustrated embodiment includes a graphics output 116A, an audio output 116B and a video output 116C. It should be apparent to those of skill in the art that other output formats may be provided among the plurality of outputs 116. Further, the processing device 102 may be programmable for operation in any of a plurality of modes (e.g., predefined modes) to provide the original data 101 in any one of a plurality of specific output formats at the outputs 116.

The system 100 includes a plurality of communication paths for communication of data between various system elements as is described in greater detail below. The communication paths may include a hardware communication path (e.g., a communication bus). For example, a first communication path 129 exists between the output 109 of the computer 106 and the input 114 of the processing device 102. According to one embodiment, where the processing device 102 is external to the computer 106, the first communication path 129 includes a cable and connectors to connect an output port of the computer 106 with the input 114. A second communication path 131 can exist between the I/O 130 of the signal processing circuitry 110 and the I/O 124 of the controller 112. A third communication path 136 can exist between the output 126 of the controller 112 and the input 134 of the control module 104. A fourth communication path 137 can exist between the second I/O 126 of the controller 112 and the input unit 118 via input 117. Other communication paths may also be employed, for example, within the signal processing circuitry 102.

According to one embodiment, the third communication path 136 includes a Universal Serial Bus ("USB") where the computer 106 includes a USB port 135, the processing device 102 includes a USB port 139, and the path 136 includes a USB cable which connects the ports 135, 139.

In general, the system 100 operates by receiving the original data 101, which may be in any one or a plurality of general formats (e.g., an audio signal, a video signal, a graphics signal, etc.) where each of the general formats may include any of a plurality of specific formats. For example, video formats may be analog or digital formats such as HD-video or SD-video (e.g., NTSC, PAL, 1080i; 720p, etc.); audio formats may be analog formats or digital formats (e.g., WAV, MP3, OGG, etc.); graphics formats may be analog format or digital format (e.g., YUV, RGB, GIF, JPG, TIFF, TGA, etc.). In addition, the original data may be supplied in a compressed format and generated as an output at the output 116 in an uncompressed format.

In various embodiments, the original data 101 may be generated by one or more systems internal to the computer (e.g., one or more software applications), by one or more systems external to the computer 106 or by a combination of each of the preceding. For example, the audio and video may be supplied from a video editing package. Alternatively, the original data 101 may include both graphics data generated by an animation application and audio data generated by a second application where the audio provides a sound track for a composition including the animation. In one embodiment, the control module formats the original data into a single format. According to one embodiment, the control module 104 formats all the various data into a graphics format and the output of the control module 104 is communicated to the output device 108. The output device 108 receives and processes the graphics data provided by the control module, and in general, processes the data as it would any other image.

The control module 104 may format the original data 101 in a format other than a graphics format. In particular, the control module may format the original data 101 in a format that is compatible with other types of output devices (i.e., other than graphics output devices). For example, the control module may format the original data in a format that is compatible with a USB or a 1394 bus. In addition, some embodiments of the invention may format the original data for one or more of a PCI, a PCI-X and/or a PCIe bus.

The output device 108 communicates the graphics signal to the processing device 102 and, in accordance with one or more embodiments, processing device 102 decodes the original data included in the graphics signal received at the input 114, formats the data in either the original format or a new format, aligns the data with a timing signal (e.g., synchronizing signal), and generates at least one output signal. According to one embodiment, the processing device generates a plurality of output signals that are both synchronized with one another and frame-accurate with respect to the original data.

In one embodiment, the control module 104 is a software-based control system. The control module 104 may, however, be implemented in any of software, firmware, hardware or a combination of any of the preceding. According to one embodiment, the control module 104 includes a plurality of modules, for example, the control module 104 may include a formatting module 138 and a frame control module 140. In one embodiment, the formatting module 138 receives the original data in the original formats and converts the original data 101 into a graphics signal. In one exemplary embodiment, the original data is encoded into a plurality of frames of graphics data where a frame of graphics data corresponds to each unique frame of original data. When referring to data such as video that is received by the control module 104 in one or more frames, the "uniqueness" of the frames of original data describes the fact that they are the frames included in the original data 101. In other words, unique frames do not include those frames that may be added during processing by the system 100. Uniqueness of the frames of original data does not depend upon the content of the frame. For example, if the original data 101 includes one or more frames that include the same data, those frames are considered unique despite the repeated content.

Similarly, audio data that is not received in "frames" is unique if, for example, it corresponds to a unique frame of video. The preceding can result when each of the video frame and the corresponding audio are uniquely identified in a manner that allows the control module 104 to associate each with one another.

As seen from the preceding, each type of original data 101 is not necessarily received in a "frame-format," for example, streaming audio. Further, as should be apparent to those of skill in the art, the system 100 does not require either a frame-format of the original data or a frame-format output. The system 100 is adaptable for use with a variety of input types and outputs depending upon the application.

In addition to the original data 101 that is formatted in the frames of the graphics signal, according to one embodiment, the formatting module 138 also encodes control information in each frame. The control information may, in various embodiments, be used by elements of the system 100 (including elements of the processing device 102) for a variety of purposes. For example, in various embodiments, the control information (e.g., a tag) may include a frame ID, an indication of the number of audio samples for which data is included in the frame, the quantity of video signals included in the frame, an indication of whether the frame is a disposable frame, scaling information for the frame, system clock information and the like. The control information is not limited to the preceding and may include any one or any combination of the preceding with additional information. In addition, in some embodiments, the original data 101 is formatted in the frames of the graphics signal without any control information.

In accordance with one embodiment, the frame control module 140 controls a rate at which the unique frames of the original data 101 are communicated to the output device 108. In one embodiment, the frame-rate control results when the frame control module 140 receives feedback concerning the capacity of the signal processing circuitry 110. For example, the feedback may indicate that the signal processing circuitry is at or above a capacity (e.g., a maximum capacity). In response, the frame control module 140 can instruct the formatting module 138 to modify the transmission of data to the output device 108, for example, by delaying the transmission of new frames to the processing device 102. "New frames" are any of the frames of the original data 101 that the signal processing circuitry 110 has not yet received.

In one embodiment, the feedback concerning the capacity of the signal processing circuitry 110 is established to prevent a loss of original data that may otherwise occur because the signal processing circuitry 110 has received more data than can be processed. In one embodiment, the input unit 118 has a capacity for receiving the graphics data at a rate that exceeds a rate at which the output unit 122 communicates data stored in the storage device 120 to the output 116.

According to one or more embodiments, the capacity "bottleneck" in the signal processing circuitry 110 results because the capacity of the storage device 120 is insufficient to store a quantity of data after it is processed (e.g., decoded and formatted) by the input unit 118 and before the data is communicated to the output 116. That is, the graphics controller transmits data at a rate that is greater than the rate at which data is processed by the processing device 102. As a result, the storage capacity of the memory 120 is eventually reached.

Because the control module 104 transmits data to the output device 108 on a continuous basis when operating, however, the system 100 does not simply stop the data transmission when the signal processing circuitry 110 is at the storage capacity. Instead, the formatting module 138 adds one or more disposable frames to the graphics data supplied to the output device 108. According to one embodiment, a disposable frame is a frame that can be discarded without the loss of the unique original data. That is, disposable frames include extra frames added to the original data by the formatting module (i.e., even where the extra frames include repeat frames of original data). As is described in greater detail below, according to one embodiment, these disposable frames may be discarded by the signal processing circuitry 110 before they are communicated to the storage device 120.

For example, in one embodiment, the input unit 118 identifies and discards the disposable frames before the disposable frames are processed. According to one embodiment, the control information included in the frame indicates to the input unit 118 that the frame is a disposable frame and therefore should be discarded. For example, the formatting module 138 may embed a time stamp in the data stream where the time stamp allows the input unit 118 to recognize the corresponding frame as a frame that should be discarded. In one embodiment, each frame includes a "tag" representing the frame number. According to one embodiment, the control module 104 assigns a tag number (e.g., a unique number) sequentially to each unique frame. In a version of this embodiment, each disposable frame is a copy of a previous frame (e.g., a copy of the immediately preceding frame). The input unit 118 recognizes the frame as a disposable frame when the duplicate frame number is identified.

In other embodiments, the controller 112 identifies the disposable frames for the input unit. In one embodiment, the controller determines that the processing device 102 has received a disposable frame by tracking an elapsed time following the communication of a "stop sending new data" signal from the controller 112 to the control module 104. That is, the controller 112 instructs the input unit 118 to discard a frame because the frame is received following a predetermined period of time after generation and/or communication, by the controller 112, of a signal indicating that the signal processing circuitry 110 is at capacity.

In one embodiment, the input device 118 is a graphics decoder and formatter that receives graphics data transmitted in a series of frames from the output device 108 (e.g., the output of a graphics controller) via the input 114. The input device 118 identifies the regions in each frame where each of the various types of data are present in the graphics image, determines the format or formats that the original data should be converted to, and converts the data encoded in the graphics image to the output data format or formats. For example, if the original data 101 includes audio in a particular audio format or video data in a particular video format, the input device 118 converts the information in a frame of graphics information that corresponds to the audio data and the video data into an output format (e.g., a new format or the audio format and the video format from which the data originated).

In other embodiment, all or a portion of the conversion of the data encoded in the graphics image is completed by the output unit 122. For example, the input unit 118 may decode the data in the graphics signal and the output unit 122 can then convert the decoded data to the output format or formats. For example, the conversion may result in the data corresponding to the original data being converted to a format for transmission over an established digital transmission medium such as a SDI link. The original data (whether audio, video or graphics) may also be converted into an analog format for use with various types of devices including televisions, display monitors, and sound systems.

In various embodiments, the input unit 118 may complete the preceding steps without the use of control information. For example, the original data may include a plurality of video frames (i.e., the original data is in a single format) that are processed by the control module 104 and communicated to the input unit 118 from the output device 108 as frames of graphics data without control information and without audio data. The signal processing circuitry 110 can, in one embodiment, generate output data (e.g., at the video output 116C) as the original data in the original video format.

In addition, embodiments of the invention may convert the original data encoded in the graphics signal to one or more output formats that differ from the original format or formats of the data (i.e., the original data is converted to a new format). For example, the original data may be in a compressed format while the converted data generated by the input device 118 is in an uncompressed format. Similarly, the original data may be in a high definition ("HD") video format while the converted data is in a standard definition ("SD") video format. The system 100 is not limited to any particular output format.

As mentioned above, the processing device 102, in particular, the signal processing circuitry 110, may operate in any of a plurality of different operating modes that allow the signal processing circuitry 110 to interpret the data in the frames of the graphics signal. That is, each operating mode may identify a format of the graphics frames (in which the original data is encoded) as supplied by the output device 108 to be processed by the signal processing circuitry. Because the format of the graphics frames generated by the output device 108 may vary based on the original format of the original data 101, the above approach provides the processing device with the adaptability to process each of a variety of different graphics frame formats.

Examples of some of the various frame formats are provided below. In general, however, the location of the original data encoded in the graphics frame (in a region or regions in the frame) may vary depending upon the original format. The signal processing circuitry can locate the original data encoded in the frame despite the variations in the graphics frame format.

In one embodiment, the input device 118 is a hardware-based device that processes the graphics data based on the control information that the formatting module 138 has encoded in the graphics signal. The input device 118 may, for example, include an application specific integrated circuit ("ASIC"), a field programmable gate array ("FPGA") or other circuitry as is known by those of ordinary skill in the art.

In accordance with one embodiment, the controller 112 is a microcontroller capable of communicating with each of the elements of the signal processing circuitry 110. The controller 112 may be a FPGA or an ASIC, for example. In one embodiment, the controller 112 is included as part of the signal processing circuitry 110. In another embodiment, the processing device 102 employs a "unified" architecture where the controller 112 can be a microcontroller embedded in the same chip that includes the input unit 118.

According to one embodiment, the controller 112 may receive instructions from the control module 104 that indicate the format of the original data, the characteristics of graphics frames that will be communicated to the processing device 102, and the desired output format to be provided at the output 116. In one embodiment, the controller 112 provides the information necessary to "set" the input unit 118 to an operating mode that is suitable for the graphics format of the frames that will be supplied from the output device 108. For example, the input unit 118 may include firmware that includes a plurality of predefined operating modes and the controller 112 instructs the input unit 118 to select the appropriate operating mode based on the information that the controller 112 receives from the control module 104.

In one embodiment, prior to processing the original data, a user provides the control module 104 with information concerning the format or formats of the original data and the desired output format or formats to be generated by the processing device 102. In various embodiments, the control module 104 communicates the format information to the controller 112.

According to one embodiment, the data that has been decoded and formatted is then communicated from the input unit 118 to the storage device 120. The storage device 120 may be memory or a FIFO that employs RAM (e.g., SRAM, SDRAM, etc.), flip-flops, latches or any other suitable form of storage. According to one embodiment, the storage device 120 includes DDR2 SDRAM, for example, a HY5PS561621AFP-E3 by HYNIX SEMICONDUCTOR AMERICA or a HYB18T256160AF-5 by INFINEON TECHNOLOGIES.

In accordance with one embodiment, the output unit 122 controls the communication of data from the storage device 120 to the output 116. For example, where the desired output data format includes data in any of audio, video and graphics format, the output unit 122 controls the communication of the graphics data from the storage device 120 to the graphics output 116A, communication of the audio data from the storage device 120 to the audio output 116B and communication of the video data from the storage device 120 to the video output 116C. As mentioned above, the output unit may also convert the data to the desired output formats before communicating the data to the output 116. According to one embodiment, the output unit 122 is included in a separate chip that may be installed on a printed circuit board that includes other elements of the signal processing circuitry 110.

In one embodiment, the output unit 122 is supplied with a timing signal that can be used to synchronize each of the plurality of outputs to one another and to the timing signal. Further, the timing signal may also be used to synchronize one or more outputs with other external signals. For example, a unique video output may be synchronized with other video signals in a broadcast studio. In one embodiment, the output unit 122 includes an input 142 and the timing signal is supplied to the input 142 via the timing input 128. According to one embodiment, the source of the timing signal is an external reference source 144. In an alternate embodiment, the timing signal is generated and provided by an internal reference source 146 (shown in phantom) which is included in the processing device 102. A studio genlock source provides one example of a timing signal that is generated and provided by the external reference source 144 to the output unit 122 to align the data that is provided at each of the outputs 116A, 116B, and 116C.

In accordance with one embodiment, communication from the control module 104 to the signal processing circuitry 110 is via the output device 108. According to one embodiment, the output device 108 is a graphics display controller. According to one embodiment, the bandwidth, of the output device 108 is selected so that it meets or exceeds a combined total of the bandwidth required by all of the original data 101. Where the output device 108 is a graphics controller, an increase in bandwidth may be achieved by selecting a refresh rate and/or a display resolution of the graphics output of the controller. For example, the signal provided by the output device 108 may include a vertical refresh rate that is greater than the frame rate of original data encoded in the frames and a frame size (e.g., measured by the number of horizontal pixels and the number of lines in each frame) that is at least as large as the frames of the original data. The preceding provides one example of an approach to provide a bandwidth that is greater than the combined bandwidth of all of the original data 101, however, other approaches are possible.

According to one embodiment, the controller 112 receives information concerning the capacity of the signal processing circuitry 110 and communicates with either or both of the signal processing circuitry 110 and the control module 104. For example, the controller 112 may provide a signal (e.g., feedback) to the control module 104 when the capacity of the signal processing circuitry 110 is insufficient to allow it to process additional data. The signal may also provide some notice to the control module by indicating that the signal processing circuitry is approaching its capacity. In one embodiment, the signal is communicated from the output 126 of the controller 112 to the control module 104 and the frame controller 140 via the communication path 136.

In accordance with one embodiment, the controller 112 receives information concerning the capacity of the signal processing circuitry 110 from the signal processing circuitry at the input 124. The information may be provided by any element of the signal processing circuitry 110, however, in one embodiment, the information is provided by the storage device 120. In particular, where the storage device 120 is the portion of the signal processing circuitry 110 that limits the capacity (e.g., the storage device is frame-rate limiting) the storage device 120 likely includes the most relevant information concerning the capacity of the circuitry. In some other embodiments, the controller 112 has an active role in monitoring the capacity of the signal processing circuitry 110 whereby it is not necessary for the signal processing circuitry to actively communicate feedback to the controller 112. For example, the controller 112 may monitor the capacity of the storage device 120 and recognize when the signal processing circuitry 110 has insufficient capacity to process new data or is approaching such an operating condition.

In one embodiment, the controller 112 is included in the processing device 102 and the communication path 136 includes a communication path from the processing device 102 to the computer 106. Alternatively, the controller may be included in the computer 106 and the communication path 131 from the signal processing circuitry 110 to the controller 112 includes a communication path from the processing device 102 to the computer 106.

An output of the output device 108 is communicated to the input 114 of the processing device 102 where, in one embodiment, the signal processing circuitry converts the graphics data back to the original data in its original (i.e., native) format or other desired output format selected by the user. The output of the signal processing circuitry 102 is supplied to the outputs selected from among the plurality of outputs 116.

Figure 2:
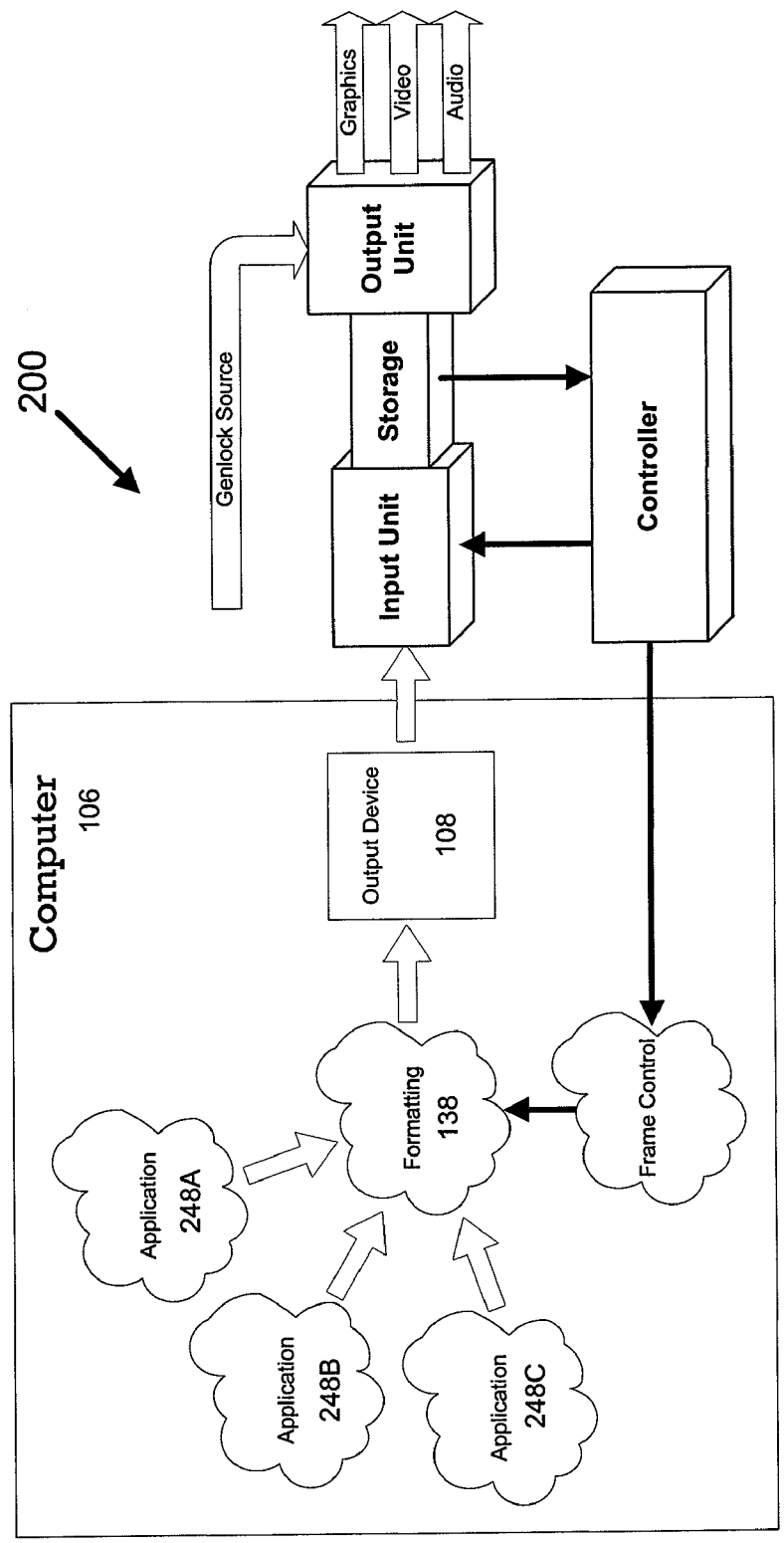
FIG. 2 is a block diagram of a system in accordance with another embodiment of the invention.

Referring now to FIG. 2, a block diagram illustrates a system 200 for converting original data in a plurality of formats to an encoded output and converting the encoded output to the original data in an output format in accordance with one embodiment. The system 200 is similar to the system 100 illustrated in FIG. 1. However, the system 200 illustrates a computer 106 where a plurality of applications 248A, 248B and 248C operating on the computer 106 supply the original data (e.g., original data 101) to the formatting module 138 as was more generally discussed with reference to one or more embodiments of the system 100.

The applications 248 can provide the original data in a plurality of formats that the formatting module 138 can convert (e.g., reformat) into a different format for transmission from the output device to the processing device 102. For example, the application 248A may be a video editing application such as Adobe Premier or Apple Final Cut which provide some original data in video format. The application 248B may be a 3D animation application such as Autodesk 3D Studio Max which provides some original data in a graphics format. The preceding applications are provided as examples. It should be apparent to those of ordinary skill in the art, that the system 200 is not limited to processing data from any particular application or applications and may process data supplied in a variety of formats by a variety of applications. According to one embodiment, the original data from each of the plurality of applications 248 is converted to a graphics signal for communication to the output device (e.g., a graphics display controller). In a version of this embodiment, the graphics display controller outputs the data supplied from the formatting module in its standard output format, for example, a DVI format, a VGA format, etc.

In various embodiments, the formatting module 138 simultaneously receives original data from each of the plurality of applications 248. In some embodiments, the data is integrated into a single composition that may include an unified output that includes audio, video and/or graphics data.

In accordance with one embodiment, the system 200 is employed to process original data in a multi-channel format. That is, the formatting module 138 formats original data from a plurality of applications in a signal where some of the original data from each channel is encoded in each frame that the formatting module generates.

Figure 3B:
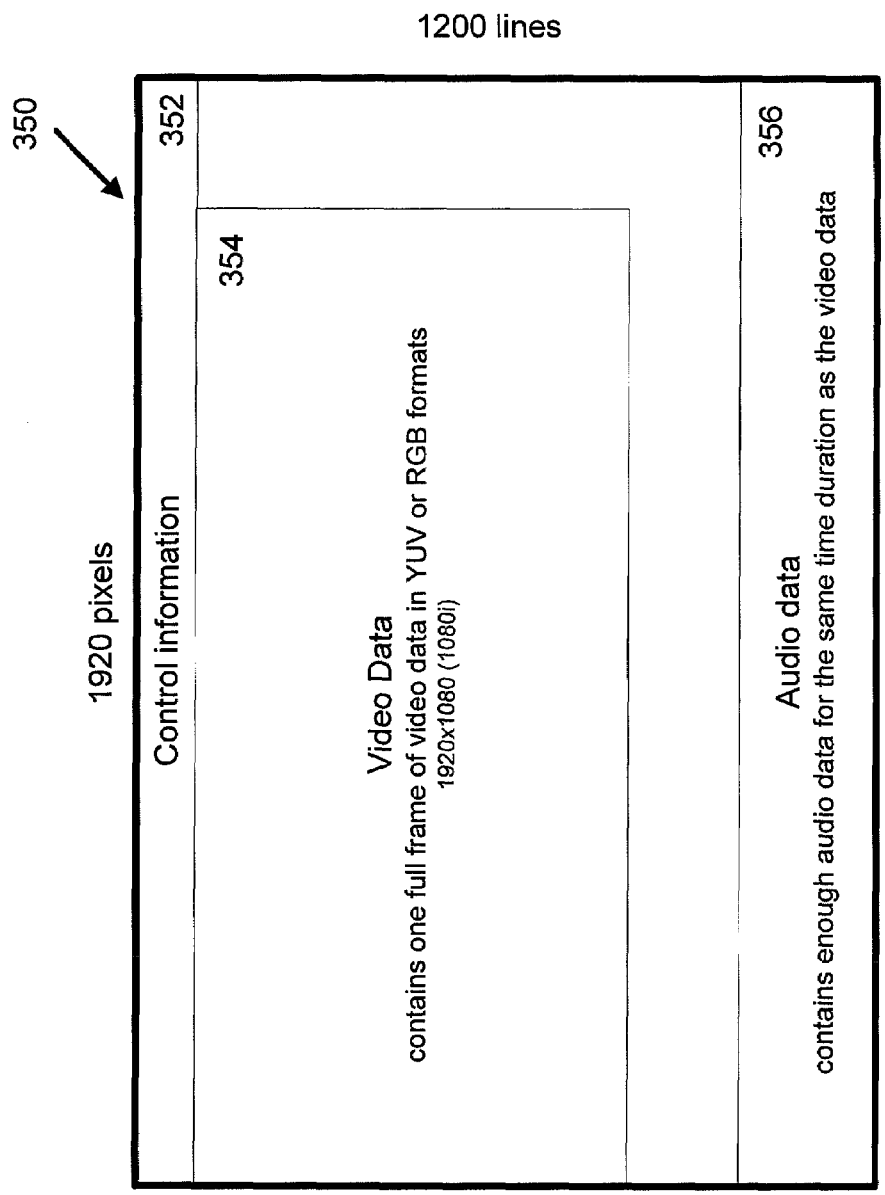
FIG. 3B illustrates a frame of graphics data including encoded audio and video data in accordance with another embodiment of the invention.

FIGS. 3A and 3B illustrate formats in which various types of original data may be encoded by the formatting module 138 and generated as an output by the output device 108. In accordance with one embodiment, FIG. 3A illustrates a frame 350 of data in a graphics format that includes a plurality of regions including: a first region 352 for encoded control information; a second region 354 for encoded video data in any one of a variety of formats; and a third region for encoded audio data. According to one embodiment, the frame 350 includes 1024 lines that each include 1280 pixels.

Although reference is made to a number of specific video formats in the following description, the mentioned formats are exemplary and are not intended to be limiting. As will be apparent to those of skill in the art, the system (e.g., the systems 100 and 200) may process any of a wide variety of analog video formats and digital video formats.

According to one embodiment, the first region 352 includes a contiguous region including one or a plurality of lines located in the upper portion of the frame. Similarly, in this embodiment, the third region 356 includes a contiguous region including one or a plurality of lines located in the lower portion of the frame. The second region 354 is located in a substantially central portion of the frame between the first region and the third region and includes a sufficient quantity of lines to store a frame of the video data. Here too, it should be apparent to those of ordinary skill in the art that the regions may be located in a different manner than illustrated in FIG. 3A. In various embodiments, the regions may be arranged in most any manner (e.g., arranged in a different relationship, bifurcated, etc.).

In one embodiment, the video data is video data originating in one of a NTSC format or PAL formats that are familiar to those of ordinary skill in the art. In another embodiment, the video data is video data, for example, high definition video data in a 720p format. A frame of each of the preceding video formats includes a different quantity of lines and pixels/line than others of the listed formats; therefore, the amount of space occupied in the second region 354 of the frame 350 by each of the formats may differ from one another, however, the second region 354 is sized to store encoded data corresponding to any of those formats. According to one embodiment, the NTSC format has a video frame size (i.e., pixels by lines) of 720 by 486, the PAL format has a video frame size of 720 by 576, and the 720p format has a frame size of 1280 by 720. In the preceding example, the second region can include a minimum of 720 lines of 1280 pixels to accommodate data for a single frame of the "largest" of the above video formats, i.e., the 720p format. In accordance with one embodiment, the video data is encoded in one of YUV format, RGB format or another suitable format.

According to one embodiment, the audio data encoded in the third region 356 is associated with the video data and includes sufficient audio data to provide sound for the full frame of video data encoded in the second region 354 of the frame 350. For example, the audio data may be a sound track that accompanies the video data where the audio data corresponds to original data produced by the same application (e.g., applications 248) that produced the video. In another example, the video data included in the second region 354 is produced by a first application (e.g., the application 248A) while the audio data included in the third region is produced by a second application (e.g., the second application 248B). In some embodiments, the audio data contains audio data that may or may not precisely correspond to the video data in the frame.

In addition, the frame 350 may include a fourth region 355 located in an area of the frame 350 that does not include control information, video data, or audio data. According to some embodiments, the fourth region 355 includes graphics data. As a result, in these embodiments, each of the frames 350 includes data supplied to the graphics output 116A, data supplied to the audio output 116B, and data supplied to the video output 116C when the frame 350 is processed by the processing device 102. Further, the frame 350 may include audio data and graphics data without any video data.

As mentioned above, the bandwidth of the output device 108 may be controlled so that the bandwidth exceeds the combined bandwidth of all of the original data 101. Thus, according to one embodiment, the frame 350 is included in a series of frames that include the encoded original data where series of frames is generated by the output device 108 at a frame rate that is greater than the frame rate of the video data in the frame. In other words, the output device 108 can generate frames of graphics data including encoded video data at a rate that is greater than the processing device 102 can generate frames of the video data at the output 116.

For example, the bandwidth of the frame 350 may be controlled by adjusting the frame size (e.g., the number of pixels and the number of lines) and the vertical refresh rate of the frame. According to one embodiment, the frame size is adapted to provide sufficient capacity to include a full frame of an encoded version of the video in the desired output format (e.g., a full frame of NTSC, PAL, 720, 1080i, etc.). In addition, in one embodiment, the vertical refresh rate is adapted to provide a bandwidth that is greater than the bandwidth of the original video data. Thus, the refresh rate of the frame 350 may be set to greater than 25 Hz where, for example, the video data is in the PAL format at 25 frames per second. In a version of this embodiment, the refresh rate is set to greater than 75 Hz. In another version, the refresh rate is set at 75 Hz. The greater bandwidth of the output device 108 facilitates an approach whereby the signal processing circuitry can discard repeated frames to, for example, produce a frame-accurate and synchronized output that includes the video and audio data encode in the frames, e.g., the frame 350.

Referring now to FIG. 3B, the frame 350 includes a different frame size and refresh rate to accommodate other video formats. The frame 350 includes the first region 352, the second region 354 and the third region 356 as described above. However, the video data is, for example, a 1080i format for HDTV encoded in the frame. In this example, the video data has a frame size of 1920 by 1080. The frame 350 in FIG. 3B is sized accordingly such that it can include encoded video data of at least 1920 pixels by 1080 lines with sufficient space to also include the accompanying control information, the audio data, and in some embodiments, graphics data. In one version, the refresh rate of the frame equals 60 Hz, however, other frame rates may also be used.

In various embodiments, the refresh rate may be adjusted to adjust the bandwidth to accommodate video in a particular format. Depending upon the type of output device 108 that is employed, in some embodiments, the adjustment of the refresh rate may be limited to discrete set points. A standard graphics display controller may, for example, provide set points at 60 Hz, 75 Hz, and other commonly employed settings.

Figure 4A:
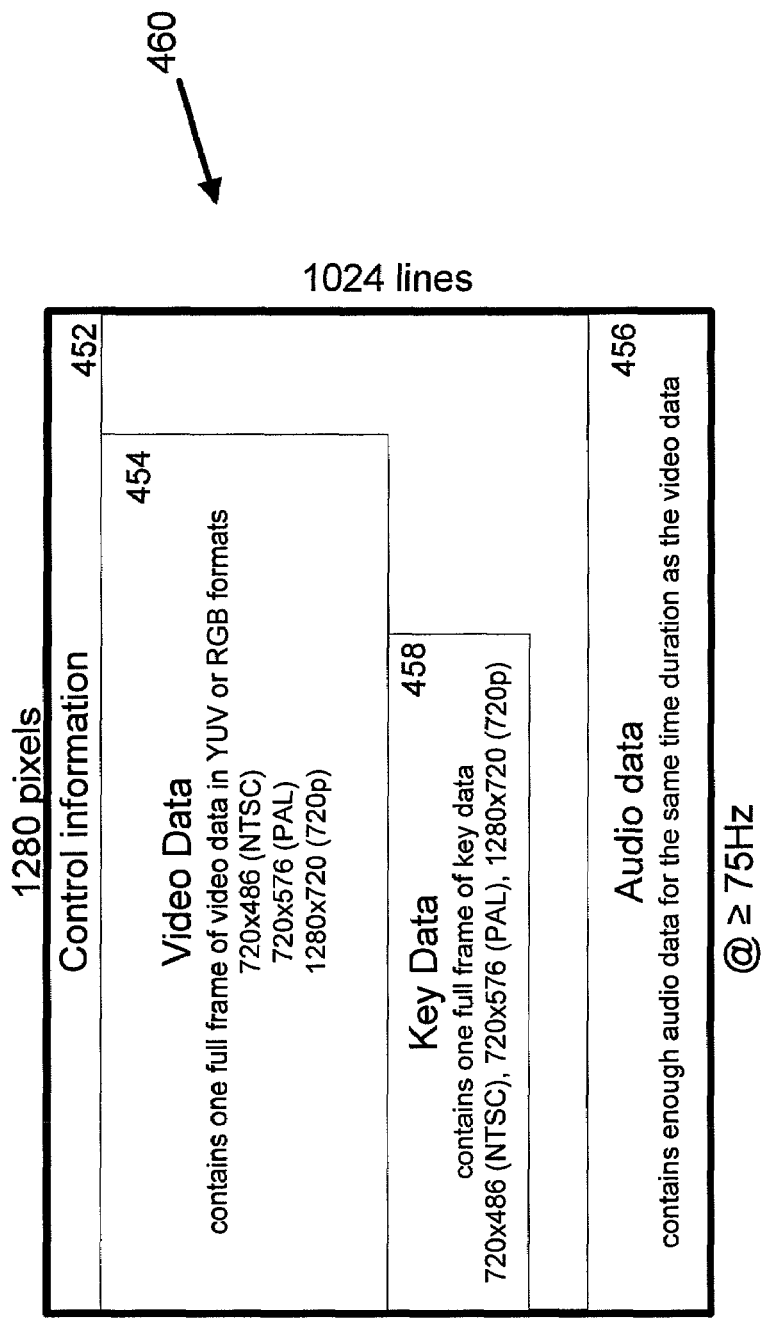
FIG. 4A illustrates a frame of graphics data including encoded audio, video and key data in accordance with a further embodiment of the invention.

Referring now to FIG. 4A, a frame 460 includes a first region 452, a second region 454, and a third region 456 as described above. According to one or more embodiments, the frame 460 also includes a fourth region 458 that includes key data. In one or more embodiments, the frame size and frame rate are selected to provide a bandwidth sufficient for any one of a variety of video signals. For example, the frame 460 illustrated in FIG. 4A includes 1280 pixels by 1024 lines and includes a vertical refresh rate of greater than 75 Hz. In some embodiments, the vertical refresh rate equals 75 Hz. Thus, the frame 460 may be used for encoding and communicating video in any of NTSC, PAL or 720p formats. In one embodiment, the fourth region 458 includes key data for a full frame of video data, for example, the video data included in the frame 460.

In accordance with one embodiment, the frame 460 is the result of a process that includes character generation, for example, the generation of graphics (e.g., an image or text) that are included in the video frame. In a version of this embodiment, the key data provides an indication of the content of each pixel, in other words, whether the pixel includes video, added graphics or a blending of the two. In versions of this embodiment, each pixel may have a value from 0-1023 to provide the information concerning the content of the pixel. In one version, each pixel has a value from 0-255.

The substantially greater bandwidth of the graphics output associated with the frame 460 provides flexibility to employ other signal processing approaches. For example, the excess capacity may allow a plurality of video signals (e.g., video streams) to be communicated via a single output of the output device 108. That is, because less than half of the frames may be employed to communicate the data corresponding to the original data the other unused frames may include an additional video signal or signals. For example, where the original format of the video and audio data matches the output formats, such an approach may be available so long as the bandwidth of the output device 108 is greater than the combined bandwidth required by the video signals in combination with the audio signals. According to one embodiment, temporal buffering is employed to communicate a plurality of video signals in a graphics signal.

Figure 4B:
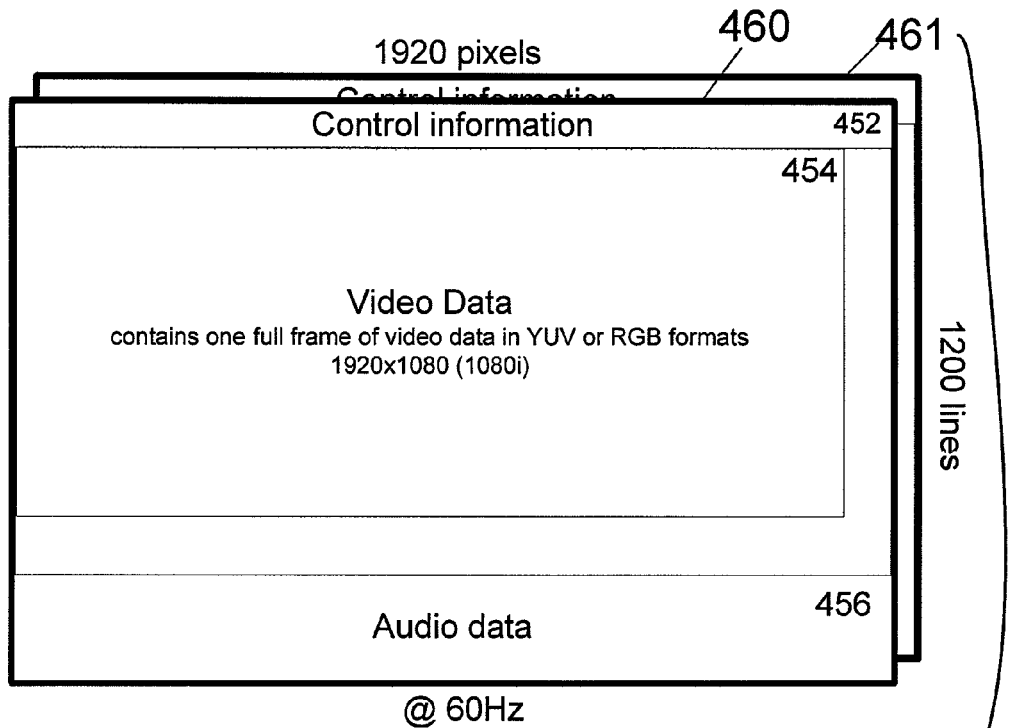
FIG. 4B illustrates a plurality of frames of graphics data including encoded audio, video and key data in accordance with yet another embodiment of the invention.
Figure 4C:
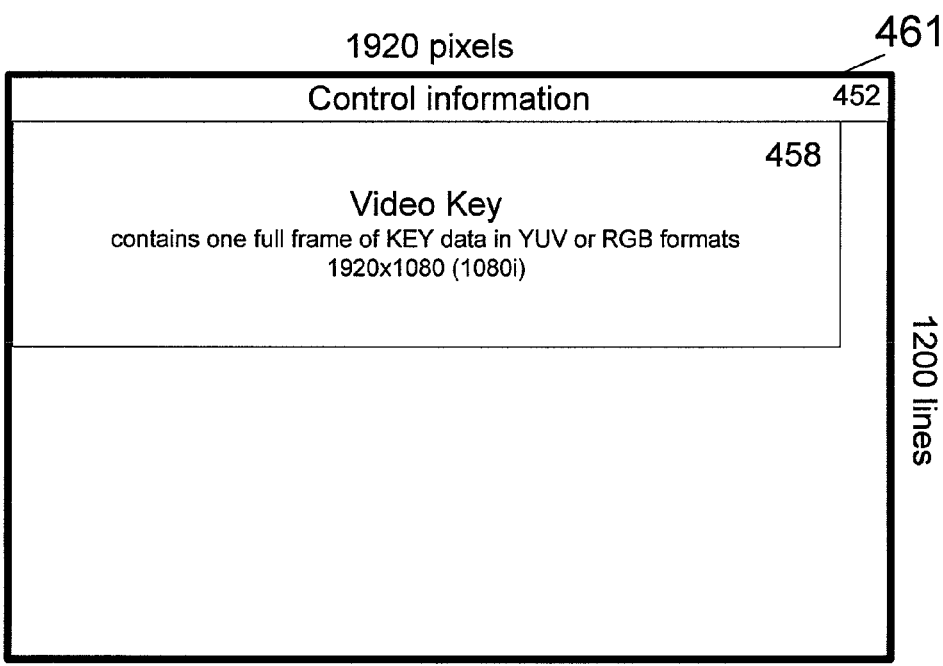
FIG. 4C illustrates a frame of graphics data including encoded key data in accordance with the embodiment of FIG. 4B.

Referring to FIG. 4B, a graphics signal includes video and associated key data. In the illustrated embodiment, the video data and the key data are temporally buffered such that a frame including encoded video data is followed by a frame including encoded key data. A frame 460 includes a first region 452, a second region 454 and a third region 456. Referring to FIG. 4C, a frame 461 includes a first region 452 with control information and a second region 458 with key data. Here, the frame size and refresh rate differ from those associated with the frame 460 in FIG. 4A. As a result, the frame 460 of FIG. 4B can be employed to encode and communicate data in different video formats. For example, the frame 460 illustrated in FIG. 4B includes 1920 pixels by 1200 lines and includes a vertical refresh rate of 60 Hz. Thus, the frame 460 may be used for encoding and communicating video in a 1080i video format.

In addition, the bandwidth of the graphics signal allows the frames of encoded key data (e.g., the frame 461) to be integrated with the frames of encoded video data. According to one embodiment, a frame of encoded video data is immediately followed by a frame of encoded key data that corresponds with the preceding frame of encoded video data where the output of the output device (e.g., the output device 108) may include a plurality of pairs of associated frames of video and key data.

Figure 12:
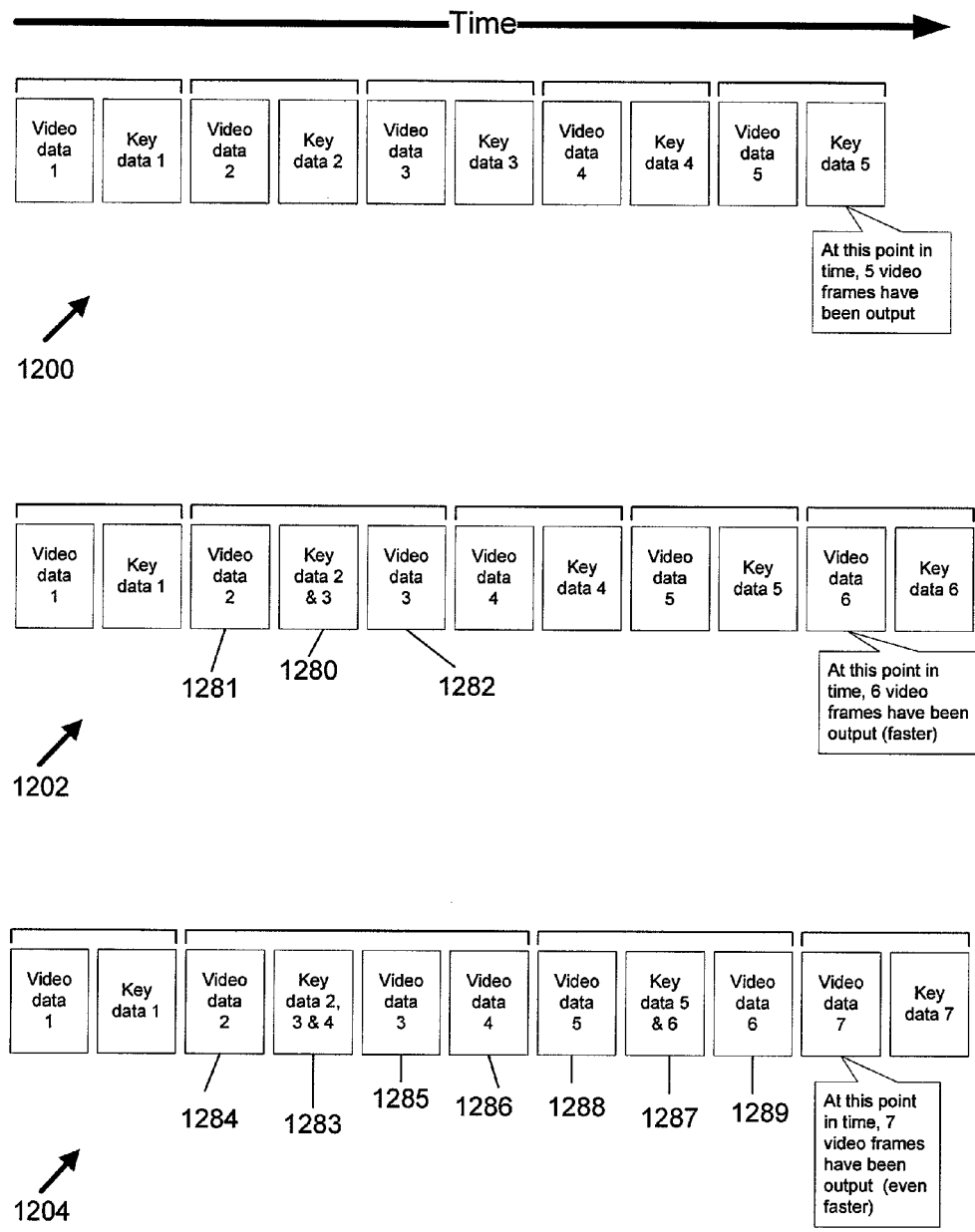
FIG. 12 illustrates a plurality of frames including encoded video data and a plurality of frames including encoded key data in accordance with further embodiments of the invention.

Referring to FIG. 12, three series of temporally-buffered video and key data encoded in frames of graphics signals are illustrated. A first series 1200 includes a series of alternating frames of graphics data where a frame of encoded video data is followed by a frame of encoded key data and the key data corresponds to the immediately preceding video data.

However, other approaches may be used. A second series 1202 illustrates a graphics signal that includes a frame 1280 with encoded key data corresponding to a plurality of frames of encoded video data. The key data need not correspond to either video data from a preceding frame or video data from an adjacent frame in the temporally-buffered series. For example, as illustrated, the frame 1280 includes key data associated with both a preceding frame 1281 and a subsequent frame 1282.

A third series 1204 illustrates a graphics signal that includes a frame 1283 with encoded key data corresponding to an immediately preceding frame of encoded video data 1284, an immediately subsequent frame of encoded video data 1285, and a non-adjacent and subsequent frame of encoded video data 1286. In addition, the third series 1204 includes a frame 1287 with encoded key data corresponding to both an immediately preceding frame of encoded video data 1288 and an immediately subsequent frame of encoded video data 1289.

The result of the approaches illustrated by the series 1202 and 1204 is an increased data transfer rate. For example, the first series 1200 includes five frames of encoded video data in the first ten frames of the graphics signal, the second series 1202 includes six frames of video data in the first ten frames of the graphics signal, and the third series 1204 includes seven frames of video data in the first ten frames of the graphics signal. As is seen from the preceding, data communication is accelerated in the series 1202 relative to the series 1200 and further accelerated in the series 1204.

Figure 5:
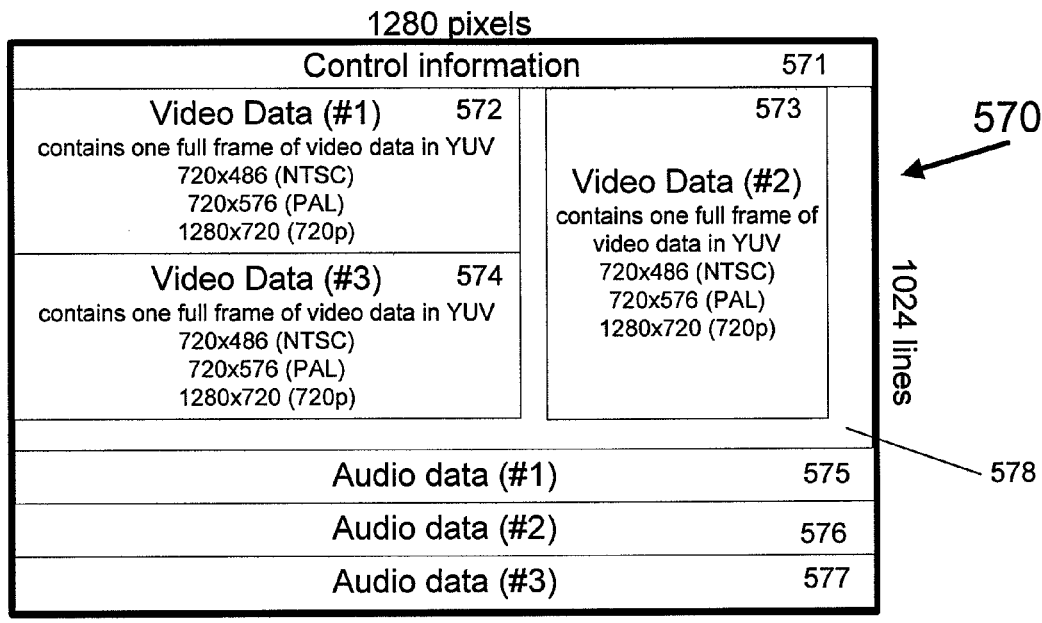
FIG. 5 illustrates a frame of graphics data including encoded audio and video for a plurality of channels in accordance with still another embodiment of the invention.

In addition to the preceding, some embodiments of the invention provide for the encoding and communication of multiple channels of data in the graphics signal. FIG. 5 illustrates one example of a frame 570 that includes data for multiple channels. According to one embodiment, the frame includes: a first region 571 for encoded control information; a second region 572 for a first channel of encoded video data in any one of a variety of formats; a third region 573 for a second channel of encoded video data in any one of a variety of formats; a fourth region 574 for a third channel of encoded video data in any one of a variety of formats, a fifth region 575 for encoded audio data for the first channel; a sixth region 576 for encoded audio data for the second channel; and a seventh region 577 for encoded audio data for the third channel. In some embodiments, the frame 570 includes an eighth region 578 for graphics data that will be communicated to the output 116A by the signal processing circuitry 102 after being included with other graphics data to provide a complete image.

According to one embodiment, the frame 570 is configured to accommodate data in a variety of video formats such as NTSC, PAL and 720p formats at a refresh rate of 75 Hz. According to one embodiment, the frame 350 includes 1024 lines that each include 1280 pixels. The above-described approach is not limited to the specific formats or types of data mentioned above. Therefore, in various embodiments, a plurality of channels of data in other formats can be encoded and communicated in the frames (e.g., frame 570) of the graphics signal. Here too, temporal buffering may also be employed increase the amount of data that is communicated in the graphics output signal of the output device 108.

Figure 6:
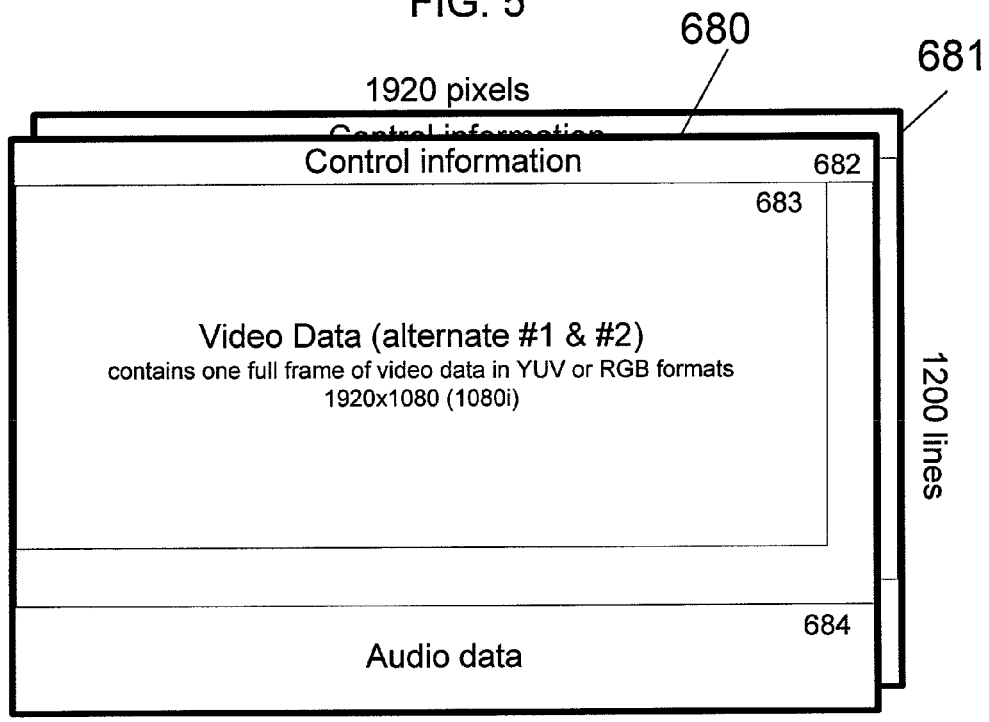
FIG. 6 illustrates a plurality of frames of graphics data including encoded audio and video in accordance with a still further embodiment of the invention.

Referring now to FIG. 6, a signal that includes temporal buffered frames for a plurality of signals is illustrated. In general, the approach illustrated in FIG. 6 takes advantage of the available bandwidth of the output device 108 by including a plurality of series of frames of data in the output that is generated by the formatting module 138 where each series includes encoded data for one of a plurality of channels. The output is then converted by the output device 108 to a graphics output signal and communicated to the processing device 102.

More specifically, according to one embodiment, the frames for each series are alternated such that a first frame from each series is communicated before a second frame from each series is communicated. FIG. 6 illustrates an example where encoded data for two video channels (i.e., channels 1 and 2) are alternated in the stream of graphics frames that are communicated to the processing device 102. As illustrated in FIG. 6, video data for a first channel appears in a first frame 680 and video data for a second channel appears in a second frame 681. Each frame 680, 681 may have an overall format that is similar to the previously described frames. That is, the frame may include a plurality of regions including: a first region 682 for encoded control information; a second region 683 for encoded video data in any one of a variety of formats; and a third region 684 for encoded audio data. Further, each frame may include a fourth region for graphics data that is output to the graphics output 116A of the processing device 102

According to one embodiment, the frames 680, 681 are sized to include 1920 pixels and 1200 lines. In a version of this embodiment, the frames 680, 681 are sized to encoded video data that is output in a 1080i format by the processing device 102. In a further version of this embodiment, the vertical refresh rate of the frames is 60 Hz. As described with reference to the previously described embodiments, the video data may be in any one of a variety of color formats, for example, the YUV or RGB formats.

The capacity of the graphics signal to transmit temporally-buffered frames of data generally depends on the capacity of the output device 108 for a particular output format (e.g., NTSC, PAL, 1080i, etc.) of the encoded data. Thus, the output device 108 may communicate data for three or more channels when configured to provide a sufficient bandwidth to do so. According to one embodiment, the output device 108 may communicate a separate first frame for each of channels I-N before communicating a separate second frame for each of channels I-N (i.e., in the same order).

In accordance with one embodiment, the processing device 102 and signal processing circuitry 110 are configured to decode the information included in the temporally-buffered graphics signal after receiving instructions from the controller 112. In a version of this embodiment, the instructions indicate that the graphics signal includes data for a plurality of channels of temporally-buffered outputs. Further, a signal from the control module 104 to the controller 112 may provide an indication to the controller 112 that the data in the graphics signal is formatted as described here.

As should be evident from the preceding descriptions of embodiments that include multi-channel data in the graphics signals, the processing device 102 may include a plurality of outputs in each generally category of outputs. That is, the processing device 102 may include a plurality of graphics outputs (e.g., graphics output 116A), a plurality of video outputs (e.g., video output 116C), and a plurality of audio outputs (e.g., audio output 116B).

Figure 7A:
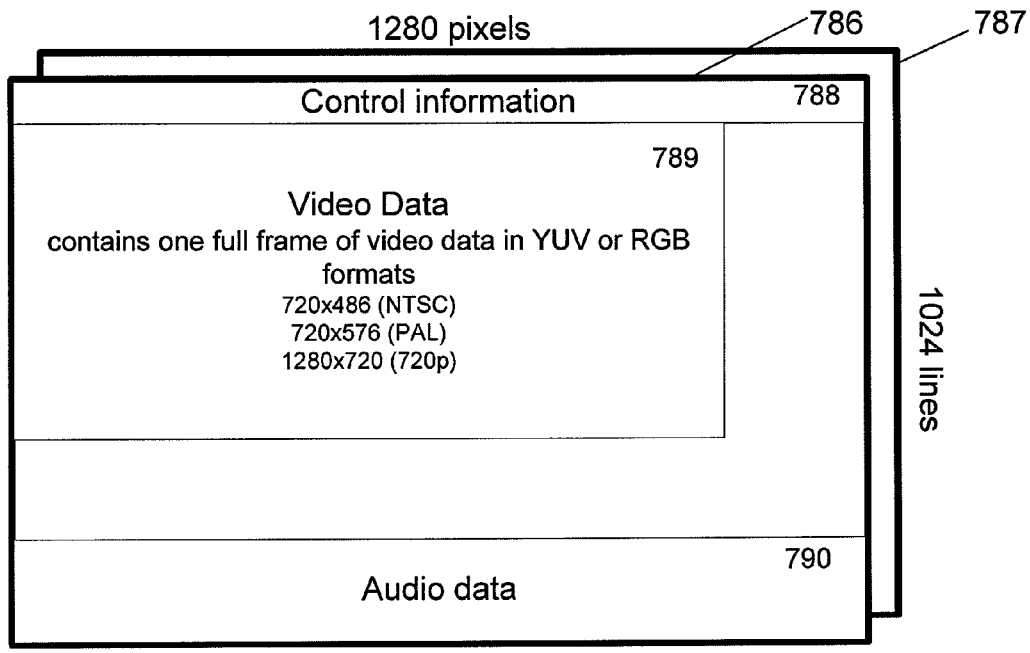
FIG. 7A illustrates a plurality of frames of graphics data in accordance with another embodiment of the invention.

As described previously, graphics data to be output at the graphics output 116A may be included in a portion of the frames that also include encoded audio data and encoded video data. In addition, however, frames of graphics data that is to be output as graphics data may also be temporally buffered with frames of encoded data to be output in another format (e.g., audio, video, etc.). FIG. 7A illustrates an embodiment of such an approach. The data stream illustrated in FIG. 7A includes a first frame 786 including encoded audio and video data and a second frame 787 that includes graphics data (e.g., graphics data in a format in which it is to be output by the processing device 102). In one embodiment, the frames include 1280 pixels and 1024 lines and a refresh rate of 75 Hz.

According to one embodiment, the first frame 786 includes plurality of regions including: a first region 788 for encoded control information; a second region 789 for encoded video data in any one of a variety of formats; and a third region 790 for encoded audio data. In accordance with one embodiment, the second frame 787 includes a full frame of graphics data. The pair of frames 786, 787 may be followed by any number of subsequent frames beginning with another frame of encoded A/V data, an immediately following frame of graphics data, and so on.

Figure 7B:
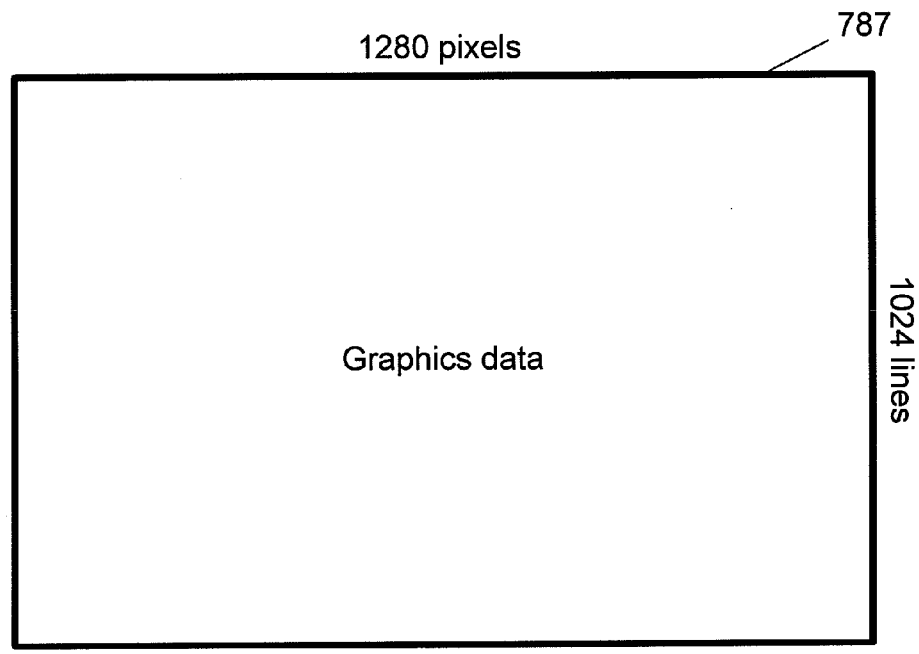
FIG. 7B illustrates a frame of graphics data according to the embodiment illustrated in FIG. 7A.

Referring to FIG. 7B, the first frame 787 of graphics data is illustrated. One advantage provided by an approach that includes full frames of graphics data as compared with an approach in which graphics data is only included in the unused portions of each frame, is that the prior approach does not require any "reassembly" of graphics data to generate a full frame of graphics.

Figure 8A:
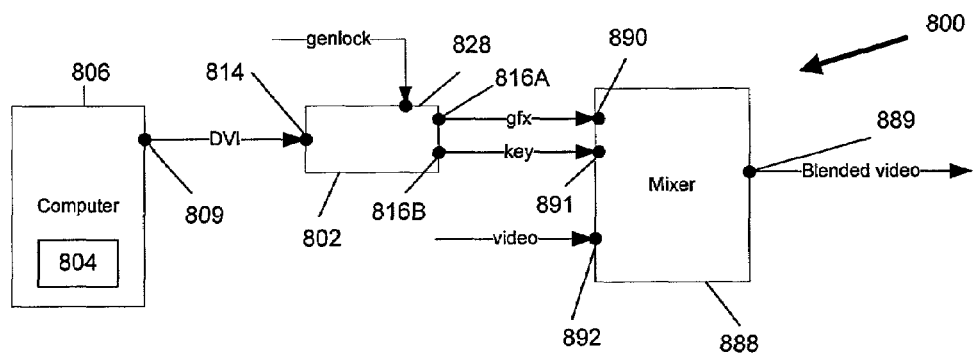
FIG. 8A illustrates a system for processing an external video signal in accordance with an embodiment of the invention.

In various embodiments, the systems 100, 200 may be employed in a system that provides character generation for integration with an external video source. For example, FIG. 8A illustrates a system 800 in which a processing device 802 is employed with a mixer 888 to generate a blended-video output 889. According to one embodiment, the system includes a computer 806 having an output 809, the processing device 802 having an input 814, a timing input 828 and a graphics output 816A and a key data output 816B, and the mixer 889 which includes a graphics input 890, a key data input 891, a video input 892, and a blended-video output 889.

In accordance with one embodiment, the output 809 is connected to the input 814, the timing input 828 is connected to a timing source, the graphics output 816A is connected to the graphics input 890, the key data output 816B is connected to the key data input 891. In general, a control module 804 in the computer 806 operates in a manner as described above and generates graphics data which is supplied to the output 809 and communicated as a graphics signal to the processing device 802. According to one embodiment, the graphics signal includes a plurality of frames which include graphics data and encoded key data. The processing device 802 processes the graphics signal and provides the graphics data at the graphics output 816A and the decoded key data at the key data output 816B. The processing device communicates the graphics data and the key data to the mixer 888. In one embodiment, the graphics output and the key data output are synchronized with a genlock signal.

The mixer 888 also receives a video signal at the video input 892. According to one embodiment, the mixer employs the key data to integrate the graphics data into the video stream as overlaid data. The mixer 888 then generates a blended video output at the blended video output 889.

Figure 8B:
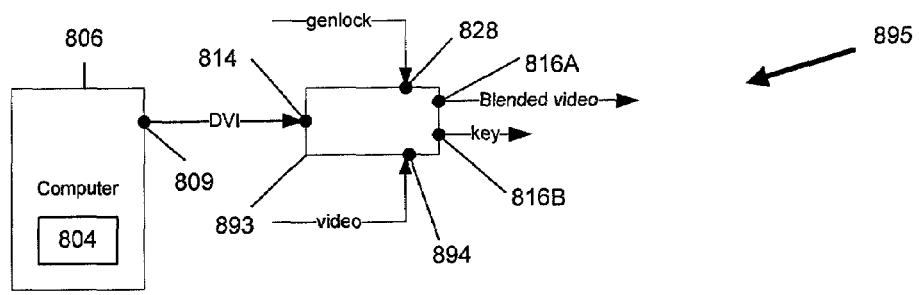
FIG. 8B illustrates a system for processing an external video signal in accordance with another embodiment of the invention.

FIG. 8B illustrates a system 895 in which a blended video output is generated without the aid of an external mixer (e.g., the mixer 888). That is, a processing device decodes data encoded in a graphics signal and generates a blended video output using the decoded information. In accordance with one embodiment, the system 895 includes a computer 806 and a processing device 893. In one embodiment, the computer 806 includes a control module 804 and a graphics output 809, and the processing device 893 includes an input 814, a timing input 828, a blended video output 816A, a key data output 816B and a video input 894. In a version of this embodiment, the video input 894 is connected to an external video source, the graphics output 809 of the computer 806 is connected to the graphics input 814 of the processing device 893, and the timing input 828 is connected to a genlock source.

In operation, the system 895 integrates key data and graphics data generated by one or more applications (e.g., software applications in the computer 806) into a graphics signal that is communicated from the computer 106 to the processing device 893. As described above, the graphics signal may include other encoded data. The processing device 893 decodes the key data and employs it to integrate graphics data into a blended video that is generated by the processing device 893 with the video received at the video input 894. The blended video is provided at the output 816A. The processing device may also provide the key data at the key data output 816B. Further, the blended video output 816A and the key data output 816B may be synchronized to the timing signal received at the timing signal input 828. Thus, in one embodiment, the processing device 893 also performs the function of a mixer and integrates one or more text characters into a video.

A general-purpose computer system (e.g., the computer 106) may be configured to perform any of the described functions including but not limited to receiving data, receiving a signal indicative of a capacity of signal processing circuitry, converting the data to a plurality of frames of graphics data which may include at least one disposable frame and communicating the plurality of frames to a graphics controller. It should be appreciated that the system may perform other functions, including network communication, and the invention is not limited to having any particular function or set of functions.

Figure 9:
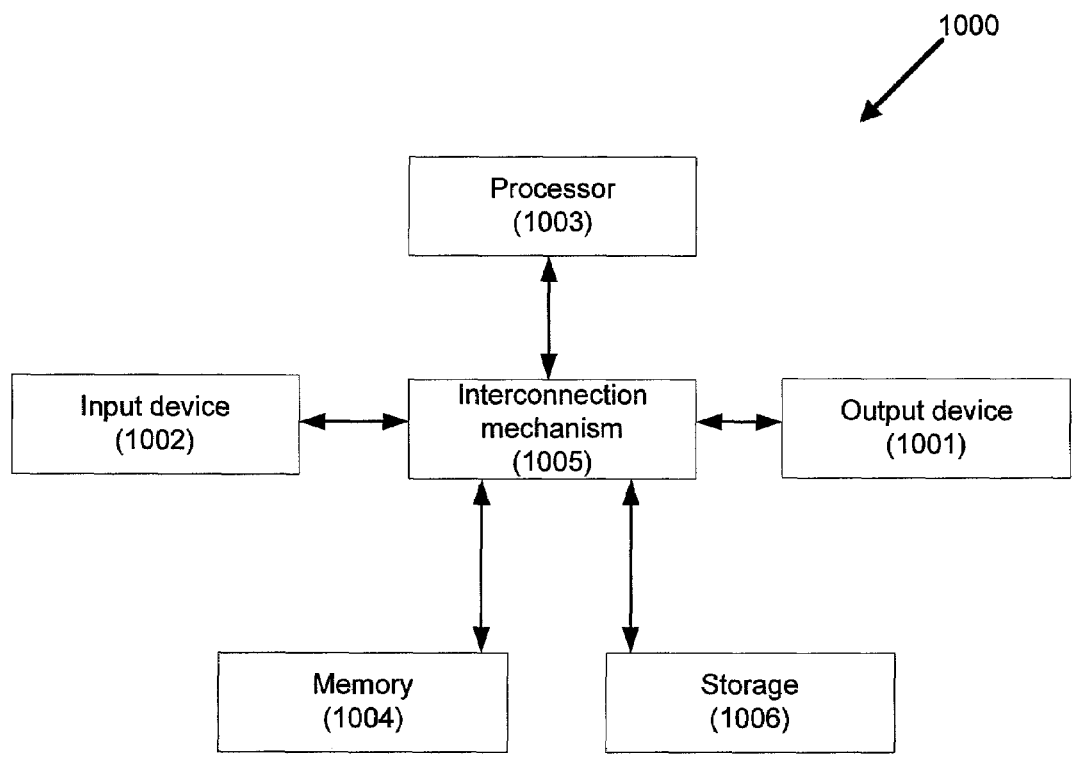
FIG. 9 is a block diagram of a computer system suitable for embodying various aspects of the invention.

For example, various aspects of the invention may be implemented as specialized software executing in a general-purpose computer system 1000 (e.g., the computer 106) such as that shown in FIG. 9. The computer system 1000 may include a processor 1003 or a plurality of processors connected to one or more memory devices 1004, such as a disk drive, memory, or other device for storing data. Memory 1004 is typically used for storing programs and data during operation of the computer system 1000. Components of computer system 1000 may be coupled by an interconnection mechanism 1005, which may include one or more busses (e.g., between components that are integrated within a same machine) and/or a network (e.g., between components that reside on separate discrete machines). The interconnection mechanism 1005 enables communications (e.g., data, instructions) to be exchanged between system components of system 1000.

Computer system 1000 also includes one or more input devices 1002, for example, a keyboard, mouse, trackball, microphone, touch screen, and one or more output devices 1001, for example, a printing device, display screen, speaker. In addition, computer system 1000 may contain one or more interfaces (not shown) that connect computer system 1000 to a communication network (in addition or as an alternative to the interconnection mechanism 1001.

Figure 10:
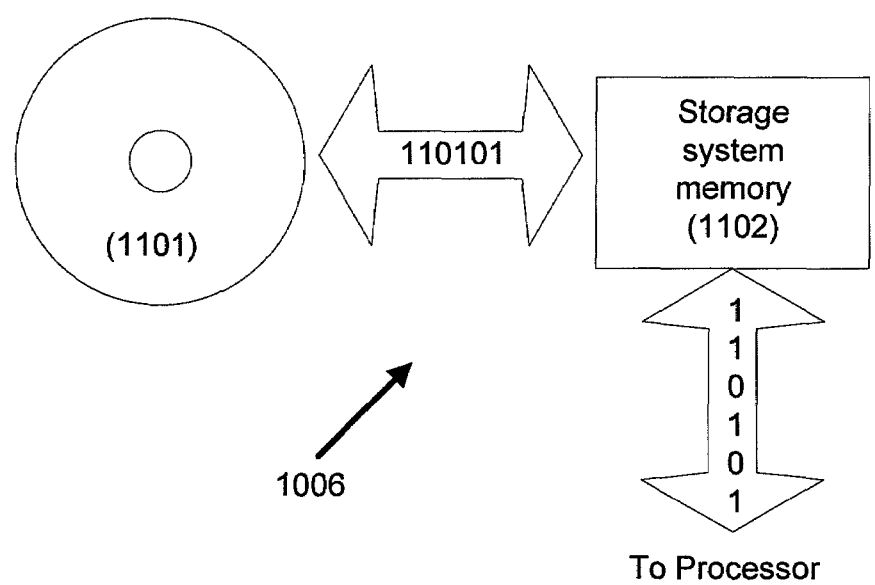
FIG. 10 is a block diagram of the storage subsystem of the computer system of FIG. 9.

The storage system 1006, shown in greater detail in FIG. 10, typically includes a computer readable and writeable nonvolatile recording medium 1101 in which signals are stored that define a program to be executed by the processor or information stored on or in the medium 1101 to be processed by the program. The medium may, for example, be a disk or flash memory. Typically, in operation, the processor causes data to be read from the nonvolatile recording medium 1101 into another memory 1102 that allows for faster access to the information by the processor than does the medium 1101. This memory 1102 is typically a volatile, random access memory such as a dynamic random access memory (DRAM) or static memory (SRAM). It may be located in storage system 1006, as shown, or in memory system 1004, not shown. The processor 1003 generally manipulates the data within the integrated circuit memory 1004, 1102 and then copies the data to the medium 1101 after processing is completed. A variety of mechanisms are known for managing data movement between the medium 1101 and the integrated circuit memory element 1004, 1102, and the invention is not limited thereto. The invention is not limited to a particular memory system 1004 or storage system 1006.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 1000 is shown by way of example as one type of computer system upon which various aspects of the invention may be practiced, it should be appreciated that aspects of the invention are not limited to being implemented on the computer system as shown in FIG. 9. Various aspects of the invention may be practiced on one or more computers having a different architecture or components that that shown in FIG. 9.

Computer system 1000 may be a general-purpose computer system that is programmable using a high-level computer programming language. Computer system 1000 may be also implemented using specially programmed, special purpose hardware. In computer system 1000, processor 1003 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME) or Windows XP operating systems available from the Microsoft Corporation, MAC OS System X operating system available from Apple Computer, the Solaris operating system available from Sun Microsystems, or UNIX operating systems available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server or multi-tier system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Figure 11:
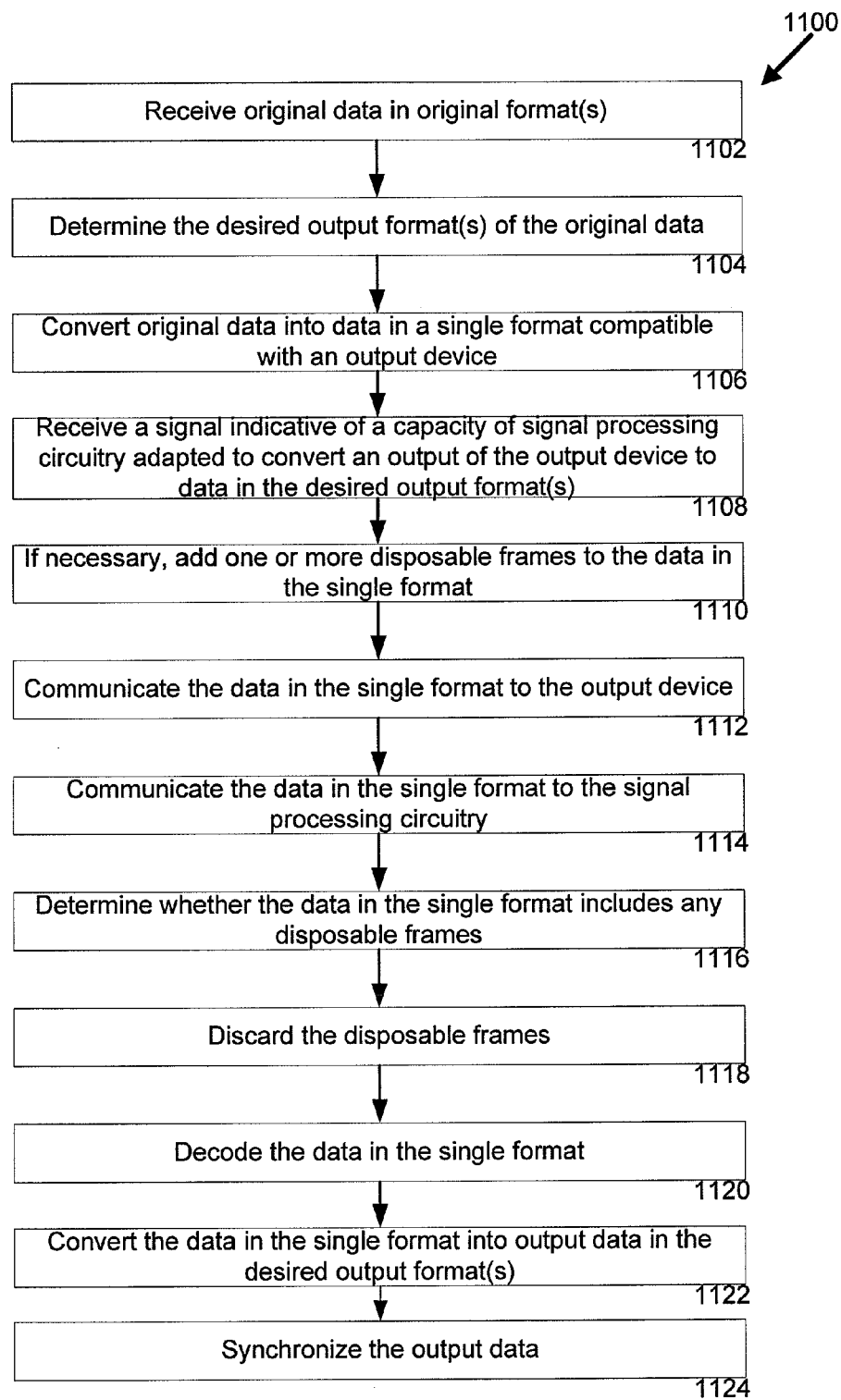
FIG. 11 is a flow diagram of a process in accordance with one embodiment of the invention.

FIG. 11 illustrates a process 1100, in accordance with one embodiment of the invention, by which original data may be processed by the system 100. The process includes an act 1102 in which original data is received in one or a plurality of original formats. At act 1104, the desired output format or formats of the original data is determined. At act 1106, the original data is converted into data in a single format compatible with an output device. In one embodiment, the process 1100 is employed with signal processing circuitry adapted to convert an output of the output device to data in the desired output format or formats. At act 1108, a signal indicative of a capacity of the signal processing circuitry is received. At act 1110, one or more disposable frames are added to the data in the single format, if necessary. At act 1112, data in the single format is communicated to the output device. At act 1114, the data in the single format is communicated to the signal processing circuitry.

At act 1116, a determination is made as to whether the data in the single format includes any disposable frames. As described above, the determination may be made as a result of identifying-information included in the frame or an alternate approach, for example, based on the time at which the signal processing circuitry receives the frame. At act 1118, one or more of the disposable frames are discarded. In accordance with one embodiment all of the disposable frames are discarded. At act 1120, the data in the single format is decoded. At act 1122, the data in the single format is converted into output data in the desired output format or formats. At act 1124, the output data is synchronized. In various embodiments the synchronization of the output data may include the synchronization of the output data in a plurality of formats with each other. In addition to, or alternatively, the output data can be synchronized with an external signal, for example, an output signal from another device.

The process 1100 in merely an illustrative embodiment of the conversion of data from one or more original formats to one or more outputs that may include new formats where the processing may be readily integrated with an existing computer system. Such an illustrative embodiment is not intended to limit the scope of the invention as any of numerous other implementations of the processing and conversion are possible and are intended to fall within the scope of the invention. For example, the order of the acts performed in the process 1100 is not limited to the order illustrated in FIG. 11 as the acts may be performed in other orders, and one or more of the acts of the method may be performed in series or in parallel to one or more other acts or parts thereof. For example, the receipt of a signal indicative of the capacity of the signal processing circuitry may be received at any time prior to the addition of the one or more disposable frames. Further, in various embodiments, the disposable frames may be discarded at another point in the process 1100, for example, after the decoding but prior to the conversion of the data.

The process 1100 and the various acts included therein and various embodiments and variations of these acts, individually or in combination, may be defined by computer-readable signals tangibly embodied on a computer-readable medium for example, a non-volatile recording medium in integrated circuit memory element or a combination thereof. Such signals may define instructions, for example as part of one or more programs, that, as a result of being executed by a computer instruct the computer to perform one or more of the methods or acts described herein, and/or various embodiments, variations and combinations thereof. The computer-readable medium on which such instructions are stored may reside on one or more of the components of the system 1000 described above, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above discussed aspects of the present invention.

The computer described herein (e.g., the computer 106) may be a desktop computer, a notebook computer, a laptop computer, a handheld computer or other computer that includes a control module to format one or more inputs into an encoded output signal. In particular, the computer can include any output device (e.g., the output device 108) that can be employed to transmit encoded data corresponding to a plurality of output formats.

In various embodiments, the processing device 102 is provided in a form-factor that allows it to be portable. Further, the processing device may be configured so that it is hot-swappable. That is, the processing device may be connected to and disconnected from the computer 106 and the output device 108 while the computer 106 and/or output device 108 are turned on and in some cases operational, without disrupting the operation of the computer 106.

According to one embodiment, the processing device 102 (including the signal processing circuitry 110 and the controller 112) is housed in a housing that includes a variety of inputs and outputs including a DVI input, a DVI output, a genlock input, a SDI output for SDTV, composite and Y/C outputs, an analog component output for SDTV, a SDI output for HDTV, an analog component output for HDTV, audio outputs, a USB port and an input for an external power source. In a version of this embodiment, the housing includes each of a length, a width and a height that are less than seven inches.

In various embodiments, the system 100 is platform compatible with a wide variety of computer operating systems including APPLE computers and computers operating with a MICROSOFT operating system.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An apparatus comprising:
an input configured to be coupled to an output of a graphics controller and to receive data encoded in a graphics signal from the graphics controller where the graphics signal includes a plurality of frames including a plurality of frames of original data and at least one disposable frame added to the original data, wherein the original data includes data in at least one of a plurality of original formats;
a plurality of outputs including at least one output corresponding to each of a plurality of output formats; and signal processing circuitry in communication with the input and the plurality of outputs, the signal processing circuitry configured to convert the data encoded in the graphics signal to output data which includes all of the frames of original data in an uninterrupted sequence in which the frames of original data appeared in the original data and communicate the output data to the plurality of outputs, wherein the signal processing circuitry is configured to generate the output data at least in part by discarding the at least one disposable frame.

2. The apparatus of claim 1 further comprising
a controller in communication with the signal processing circuitry, wherein the controller is configured to monitor a capacity of the signal processing circuitry and generate a signal that results in the at least one disposable frame being added to the plurality of frames of original data.

3. The apparatus of claim 1, wherein the signal processing circuitry discards the at least one disposable frame in response to a signal received from the controller.

4. The apparatus of claim 1, wherein the controller generates a signal indicating that a disposable frame should be added to the plurality of frames, and wherein the controller communicates to an external device the signal indicating that the disposable frame should be added.

5. The apparatus of claim 1, wherein the controller controls a rate at which the original data is converted to the output data.

6. The apparatus of claim 1, wherein the plurality of original formats includes a video format, an audio format, and a graphics format.

7. The apparatus of claim 1, wherein the plurality of frames includes a plurality of unique frames that correspond to the original data.

8. The apparatus of claim 7, wherein the signal processing circuitry converts data corresponding to the original data that is provided in the unique frames to the output data and communicates the output data, in sequence, to the plurality of outputs.

9. The apparatus of claim 1, wherein the signal processing circuitry includes an output unit adapted to align the communication of the output data from the signal processing circuitry to the plurality of outputs.

10. The apparatus of claim 9, wherein the output unit includes a timing input adapted to receive a synchronizing signal.

11. The apparatus of claim 10, wherein the synchronizing signal is an externally-generated signal.

12. The apparatus of claim 1, wherein the signal processing circuit includes a storage device, and an input unit adapted to receive data corresponding to the original data, convert the data corresponding to the original data to at least one of the plurality of output formats and communicate the data corresponding to the original data in the at least one of the plurality of output formats to the storage device.

13. The apparatus of claim 12, wherein the graphics signal includes control information, and wherein the input unit is adapted to decode the control information.

14. The apparatus of claim 13, wherein the control information includes information that identifies the at least one disposable frame as a frame to be discarded.

15. The apparatus of claim 12, wherein the at least one of the plurality of output formats is at least one of the plurality of original formats.

16. The apparatus of claim 12, wherein the at least one of the plurality of output formats is different than any of the at least one of the plurality of original formats.

17. The apparatus of claim 1, wherein the input is adapted for connection to an output of a digital graphics display controller and wherein the graphics signal is a digital graphics signal.

18. The apparatus of claim 1, wherein the output of the graphics controller includes a digital video interface port.

19. A system for encoding data in an image, the system comprising:
a formatting module adapted to receive original data in at least one of a plurality of original data formats from at least one software application, to generate modified data that includes the original data formatted for processing by a graphics controller, and to communicate the modified data to the graphics controller as a plurality of frames of graphics data;
signal processing circuitry configured to receive a signal from the graphics controller that includes the plurality of frames; and
a frame control module adapted to receive information concerning a capacity of the signal processing circuitry and generate an output to control an addition, by the formatting module, of at least one disposable frame to the plurality of frames,
wherein the formatting module is adapted to add the at least one disposable frame to control a rate at which the original data is processed by the signal processing circuitry,
wherein the signal processing circuitry is configured to generate an output signal from the plurality of frames by discarding at least one of the at least one disposable frame added by the formatting module and received from the graphics controller,
wherein the original data includes a plurality of frames of original data, and
wherein the output signal includes all of the plurality of frames of original data in an uninterrupted sequence in which the frames of original data appeared in the original data.

20. The system of claim 19, wherein the information concerning the capacity of the signal processing circuitry provides an indication that the signal processing circuitry has insufficient capacity to process new data from the graphics controller.

21. The system of claim 20, wherein, in response to the indication that the signal processing circuitry has insufficient capacity, the formatting module adds the at least one disposable frame to the plurality of frames.

22. The system of claim 21, wherein the formatting module is adapted to include control information in the modified data, and wherein the at least one disposable frame includes control information that identifies the at least one disposable frame as a disposable frame.

23. The system of claim 19, wherein the signal processing circuitry includes a storage device, and wherein the signal processing circuitry is adapted to discard the at least one of the at least one disposable frame before the signal processing circuitry stores the plurality of frames in the storage device.

24. The system of claim 19, wherein the at least one disposable frame includes a plurality of disposable frames.

25. The system of claim 24, wherein the signal processing circuitry is adapted to discard each of the plurality of disposable frames.

26. The system of claim 19, wherein the signal processing circuitry includes an input configured to be coupled to an output of the graphics controller.

27. The system of claim 26, wherein the output of the graphics controller includes a digital video interface port.

* * * * *